(12) United States Patent
Cheng

(10) Patent No.: US 11,827,265 B2
(45) Date of Patent: Nov. 28, 2023

(54) MOVABLE CARRIER AND FOLDING METHOD THEREFOR

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 351 days.

(21) Appl. No.: 17/339,431

(22) Filed: Jun. 4, 2021

(65) Prior Publication Data
US 2021/0291887 A1    Sep. 23, 2021

Related U.S. Application Data

(63) Continuation-in-part of application No. 16/502,769, filed on Jul. 3, 2019, now Pat. No. 11,052,933.

(60) Provisional application No. 62/694,237, filed on Jul. 5, 2018.

(51) Int. Cl.
*B62B 7/10* (2006.01)
*B62B 7/00* (2006.01)

(52) U.S. Cl.
CPC .............. *B62B 7/105* (2013.01); *B62B 7/008* (2013.01)

(58) Field of Classification Search
CPC ................................ B62B 7/105; B62B 7/008
See application file for complete search history.

(56) References Cited

U.S. PATENT DOCUMENTS

| 4,725,071 A * | 2/1988 | Shamie ................... B62B 7/123 280/658 |
| 8,157,273 B2 | 4/2012 | Bar-Lev |
| 2009/0278335 A1* | 11/2009 | Dotsey ...................... B62B 7/10 280/647 |
| 2013/0270800 A1 | 10/2013 | Chiang |
| 2014/0183843 A1* | 7/2014 | Iftinca ..................... B62B 9/245 280/647 |
| 2015/0048599 A1* | 2/2015 | Liu ......................... B62B 7/142 280/642 |

FOREIGN PATENT DOCUMENTS

| CN | 102632916 A | 8/2012 |
| CN | 202518316 U | 11/2012 |
| CN | 202518317 U | 11/2012 |

* cited by examiner

*Primary Examiner* — Bryan A Evans
(74) *Attorney, Agent, or Firm* — Muncy, Geissler, Olds & Lowe, P.C.

(57) ABSTRACT

A movable carrier includes a bottom frame assembly, a first support member, a link assembly, a position mechanism, and a first unlock member. The first support member has a first end portion pivotally connected to the bottom frame assembly. The link assembly includes a link member and a first connect member. The link member is disposed at a second end portion of the first support member. The first connect member is pivotally connected to the link member and connected to the second end portion through the link member. The position mechanism is disposed on the link assembly and corresponds to the first connect member. The first unlock member is disposed on the link assembly and connected to the position mechanism. When the first unlock member contacts the bottom frame assembly, it carries the position mechanism to move to change the position of the first connect member.

20 Claims, 37 Drawing Sheets

MOVABLE CARRIER AND FOLDING METHOD THEREFOR

CROSS REFERENCE TO RELATED APPLICATIONS

This application is a Continuation-In-Part (CIP) of an earlier filed, application, having application Ser. No. 16/502,769 and filed on Jul. 3, 2019, which claims priority to U.S. provisional patent application with Ser. No. 62/694,237 filed on Jul. 5, 2018, the content of which, including drawings, is expressly incorporated by reference herein.

BACKGROUND

Technology Field

The present disclosure relates to a movable carrier and, in particular, to a movable carrier and a folding method thereof that can change the relative positions of two carry members.

Description of Related Art

The movable carrier with two carry members, such as a double-seat stroller, can be used for carrying two infants at the same time. Generally speaking, the two seats of the conventional double-seat stroller are fixed and cannot be adjusted. The two infants are usually side by side when sitting in the stroller. In another case, one infant is in front and the other is in the back. In these conventional double-seat strollers, the infants both face forwardly, and the parent pushes the stroller from behind. The users cannot change or adjust the positions of the two seats by themselves, and the parents cannot immediately see the baby's facial expressions or interact with the babies.

SUMMARY

An objective of this disclosure is to provide a movable carrier and a folding method thereof. The movable carrier of this disclosure has two carry members, and the positions of the carry members are changeable. Accordingly, the relative positions of the two carry members can be changed according to the requirement of the user, thereby satisfying various requirements of the users. In addition, the folding method for the movable carrier of this disclosure can make the movable carrier become smaller (smaller occupied space), which can facilitate the storage and carrying of the movable carrier.

To achieve the above, a movable carrier of the disclosure comprises a bottom frame assembly, a first support member, a link assembly, a position mechanism, and a first unlock member. The first support member has a first end portion and a second end portion. The first end portion is pivotally connected to the bottom frame assembly. The link assembly is disposed corresponding to the first support member. The link assembly comprises a link member and a first connect member. The link member is disposed at the second end portion of the first support member, and the first connect member is pivotally connected to the link member and connected to the second end portion of the first support member through the link member. The position mechanism is disposed on the link assembly and corresponds to the first connect member. The first unlock member is disposed on the link assembly and connected to the position mechanism. When the first unlock member contacts the bottom frame assembly, the first unlock member carries the position mechanism to move to change the position of the first connect member relative to the link member.

To achieve the above, the disclosure provides a folding method for a movable carrier. The movable carrier comprises a bottom frame assembly, a first support member, a link assembly, a position mechanism, a first unlock member, a second support member, and two carry members. The first support member has a first end portion pivotally connected to the bottom frame assembly. The link assembly comprises a link member and a first connect member, the link member is disposed at a second end portion of the first support member, and the first connect member is pivotally connected to the link member and connected to the second end portion of the first support member through the link member. The position mechanism is disposed on the link assembly and corresponds to the first connect member. The first unlock member is disposed on the link assembly and connected to the position mechanism. The second support member and the first support member are crossingly connected, and one end of the second support member is pivotally connected to the bottom frame assembly. The two carry members are correspondingly disposed at two ends of the link assembly. The folding method comprises the following steps of: separating the two carry members from the link assembly; folding a part of the second support member about a folding pivot portion of the second support member toward the bottom frame assembly, thereby carrying the first support member and the link assembly to move toward the bottom frame assembly; continuously pushing the folded second support member toward the bottom frame assembly to make the first unlock member contact the bottom frame assembly so as to carry the position mechanism to move, thereby changing the position of the first connect member relative to the link member; and continuously pushing the folded second support member toward the bottom frame assembly until the second support member is parallel to the bottom frame assembly.

In one embodiment, the first unlock member comprises a leading wheel, and the leading wheel is slidable on the bottom frame assembly.

In one embodiment, the first connect member comprises at least one position portion, the position mechanism corresponds to the at least one position portion of the first connect member. When the first unlock member is pressed by the bottom frame assembly, the first unlock member carries the position mechanism to detach from the at least one position portion of the first connect member.

In one embodiment, the position mechanism comprises a position member and an elastic member, a protrusion portion of the position member is connected to the elastic member, and the protrusion portion protrudes from the at least one position portion by the elastic member.

In one embodiment, when the first unlock member is pressed by the bottom frame assembly, the first unlock member carries the protrusion portion of the position member by a connect member to automatically detach from the at least one position portion of the first connect member.

In one embodiment, the first connect member further comprises a sliding track, and the position member is slidable on the sliding track.

In one embodiment, the link assembly further comprises a second connect member and two adapter members. The second connect member is pivotally connected to the link member and connected to the second end portion of the first support member through the link member. The adapter members are disposed corresponding to ends of the first connect member and the second connect member, and each of the adapter members has an adapter portion. In a process of changing positions of the first connect member and the second connect member relative to the link member, the adapter portions are all oriented to the same direction.

In one embodiment, in the process of changing the positions of the first connect member and the second connect member relative to the link member, the first connect member and the second connect member maintain in parallel.

In one embodiment, in the process of changing the positions of the first connect member and the second connect member relative to the link member, a distance between the bottom frame assembly and each of the adapter portions is changed.

In one embodiment, each of the first connect member and the second connect member comprises a third end portion and a fourth end portion, the third end portion of the first connect member is located corresponding to the third end portion of the second connect member, the fourth end portion of the first connect member is located corresponding to the fourth end portion of the second connect member, one of the two adapter portions connects to both of the third end portion of the first connect member and the third end portion of the second connect member, and the other one of the two adapter portions connects to both of the fourth end portion of the first connect member and the fourth end portion of the second connect member.

In one embodiment, the movable carrier further comprises a second unlock member disposed on the link assembly. The second unlock member carries the position mechanism to detach from the at least one position portion of the first connect member, thereby changing positions of the first connect member, the second connect member and the adapter members relative to the link member.

In one embodiment, the movable carrier further comprises a second support member crossingly connected with the first support member. The second support member comprises a fifth end portion, and the fifth end portion is pivotally connected to the bottom frame assembly.

As mentioned above, in the movable carrier of this disclosure, the position mechanism is disposed on the link assembly and corresponds to the first connect member, and the first unlock member is disposed on the link assembly and connected to the position mechanism. When the first unlock member contacts the bottom frame assembly, the first unlock member carries the position mechanism to move to change the position of the first connect member relative to the link member. Accordingly, the movable carrier of this disclosure can be easily folded without adjusting the positions of the two adapter members of the link assembly relative to the bottom frame assembly in advance. Therefore, most users (even a weak user or a lady holding a babe or goods) can easily finish the folding operation of the movable carrier of this disclosure, which can facilitate the storage and carrying of the movable carrier.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The movable carrier and the folding method therefor according to some embodiments of the present disclosure will be apparent from the following detailed description, which proceeds with reference to the accompanying drawings, wherein the same references relate to the same elements.

In order to clearly describe the connections and structure of the movable carrier of this disclosure, the reference drawings of the following embodiments substantially show the framework of the movable carrier only, and the soft pads of the carry members (e.g. the seats) are not shown.

Figure 1:
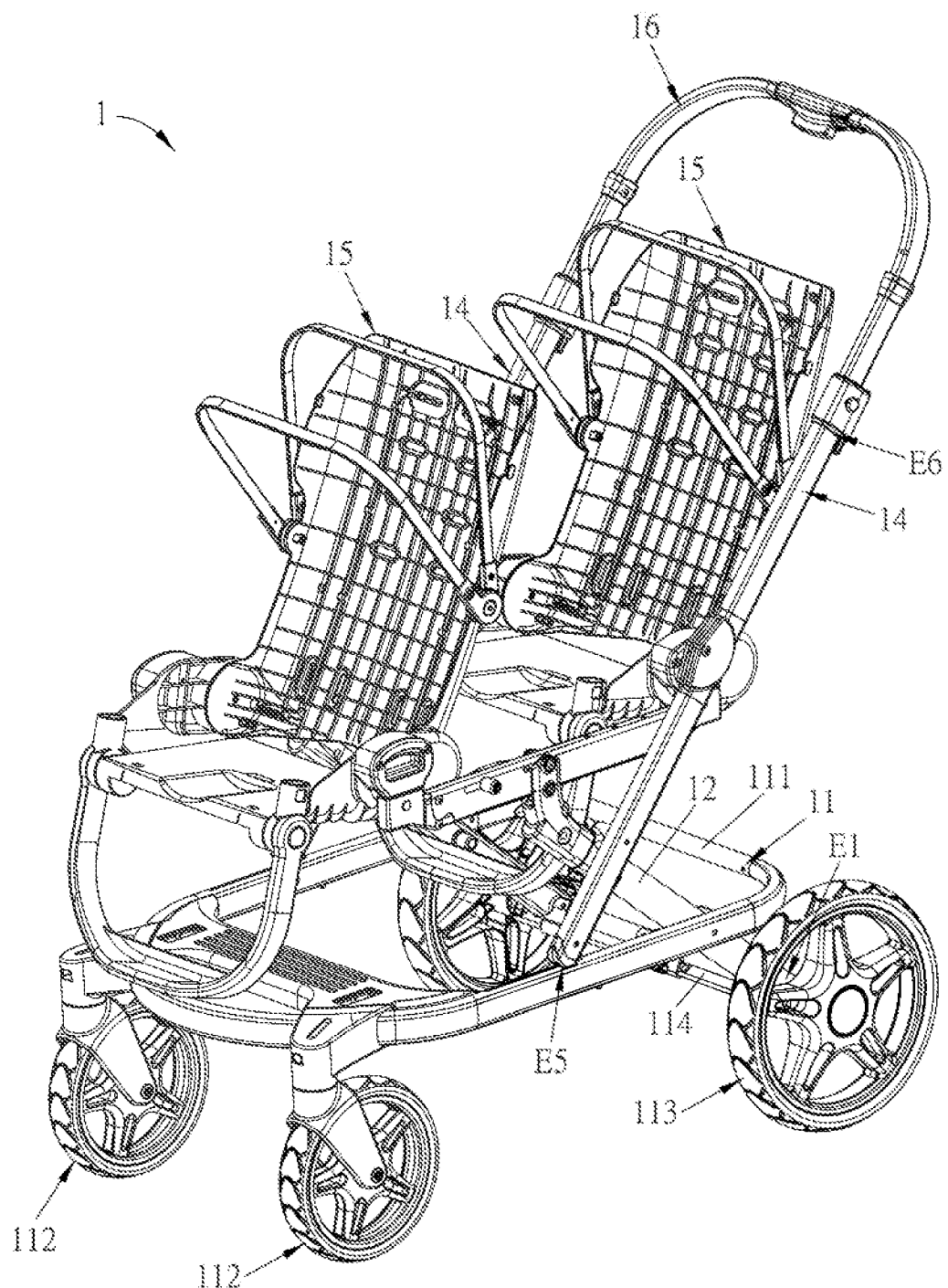
FIG. 1 is a schematic diagram showing a movable carrier according to an embodiment of this disclosure.
Figure 2A:
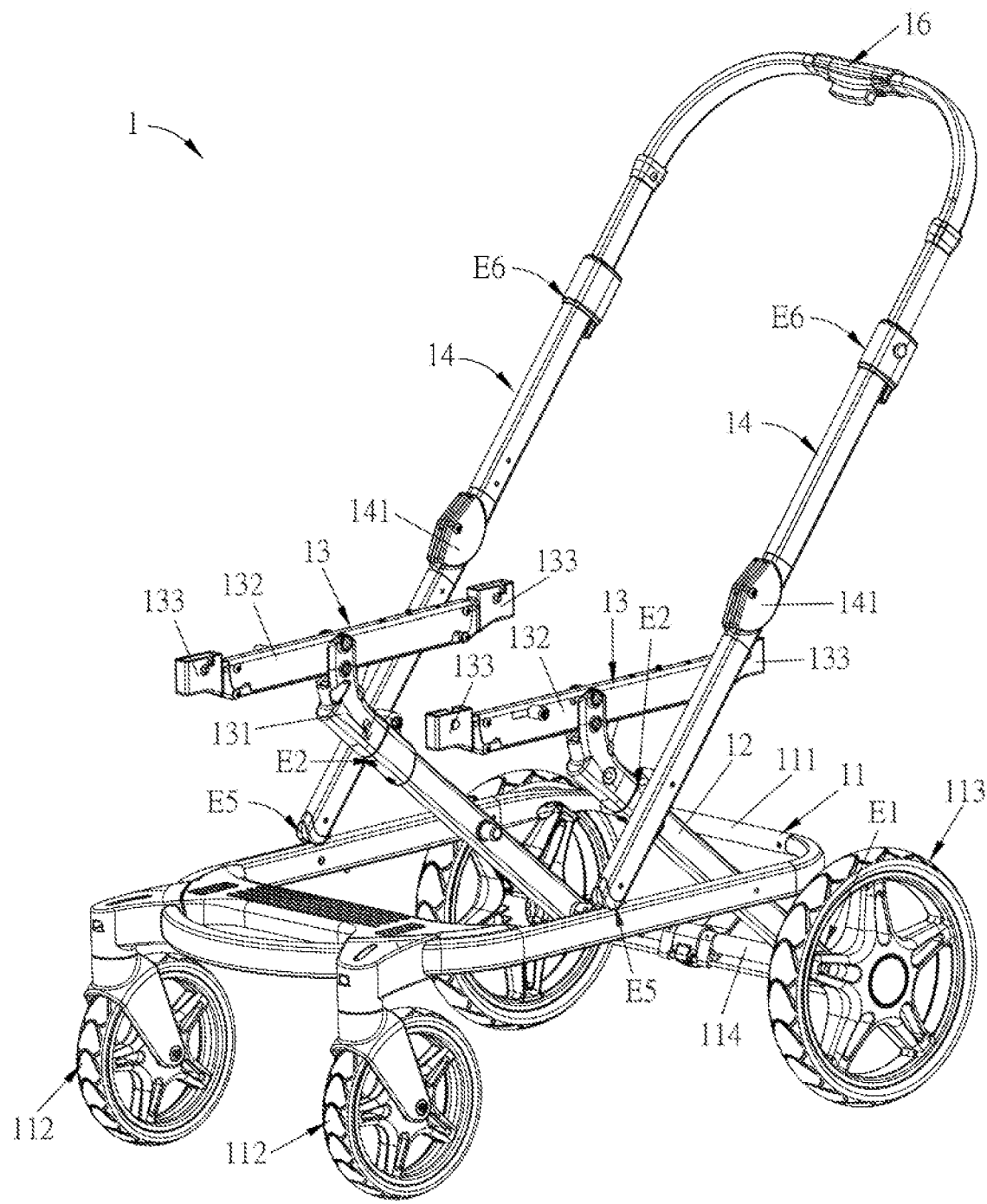
FIG. 2A is a schematic diagram showing the movable carrier of FIG. 1 without the carry members.

FIG. 1 is a schematic diagram showing a movable carrier 1 according to an embodiment of this disclosure, and FIG. 2A is a schematic diagram showing the movable carrier 1 of FIG. 1 without the carry members (seats). The movable carrier 1 is a double-seat stroller as an example.

As shown in FIGS. 1 and 2A, the movable carrier 1 comprises a bottom frame assembly 11, a first support member 12, and a link assembly 13. In addition, the movable carrier 1 further comprises a second support member 14, at least one carry member 15, and a handlebar frame 16. In this embodiment, the movable carrier 1 comprises two first support members 12, two link assemblies 13, two second support members 14, and two carry members 15. The two link assemblies 13 are located at two sides of the movable carrier 1 and correspondingly disposed on the two first support members 12, and the two carry members 15 are disposed on the two link assemblies 13.

The bottom frame assembly 11 comprises a bottom frame 111, at least one front wheel assembly 112, two rear wheel assemblies 113, and a rear wheel axle 114. The at least one front wheel assembly 112 and the two rear wheel assemblies 113 are disposed on the bottom frame 111. The front wheel assembly 112 and the rear wheel assemblies 113 are individually connected with the bottom frame 111. To be noted, the term "connect" can be implemented as "fixing" so that the connected objects cannot be relatively moved or rotated, or as "freely connecting" so that the connected objects can be relatively moved or rotated. In addition, the term "connect" can be implemented as directly connecting or indirectly connecting (connecting with other components), and this disclosure is not limited. In this embodiment, the bottom frame 111 forms a closed bottom frame structure, and the two front wheel assemblies 112 and the two rear wheel assemblies 113 are connected to the front side and the rear side of the bottom frame 111, respectively. Of course, in other embodiments, the movable carrier may have one front wheel assembly 112 and two rear wheel assemblies 113, or two front wheel assemblies 112 and one rear wheel assembly 113, and this disclosure is not limited thereto. In this embodiment, the two front wheel assemblies 112 are individually fixed on the bottom frame 111, and the two rear wheel assemblies 113 are indirectly connected with the bottom frame 111. In some embodiments, the closed bottom frame 111 can be installed with a storage member having a storage space (e.g. a storage bucket), so that the user can put any suitable object therein.

The first support member 12 has a first end portion E1 and a second end portion E2, and the first end portion E1 is connected with the bottom frame assembly 11. In this embodiment, the first end portion E1 of the first support member 12 is connected (fixed) to the rear wheel axle 114 of the bottom frame assembly 11, the rear wheel axle 114 is connected with the bottom frame 111, and the two rear wheel assemblies 113 are disposed at two ends of the rear wheel axle 114.

The second support member 14 is crossingly connected with the first support member 12. The second support member 14 comprises a fifth end portion E5 and a sixth end portion E6. The fifth end portion E5 is connected with the bottom frame 111 of the bottom frame assembly 11, and the sixth end portion E6 is connected with the handlebar frame 16. In this embodiment, the sixth end portions E6 of the second support members 14 are correspondingly connected with the two ends of the arc handlebar frame 16, respectively. In some embodiments, a shelf (e.g. a cup holder) can be disposed on the handlebar frame 16, so that the user can place a suitable object thereon.

Figure 2B:
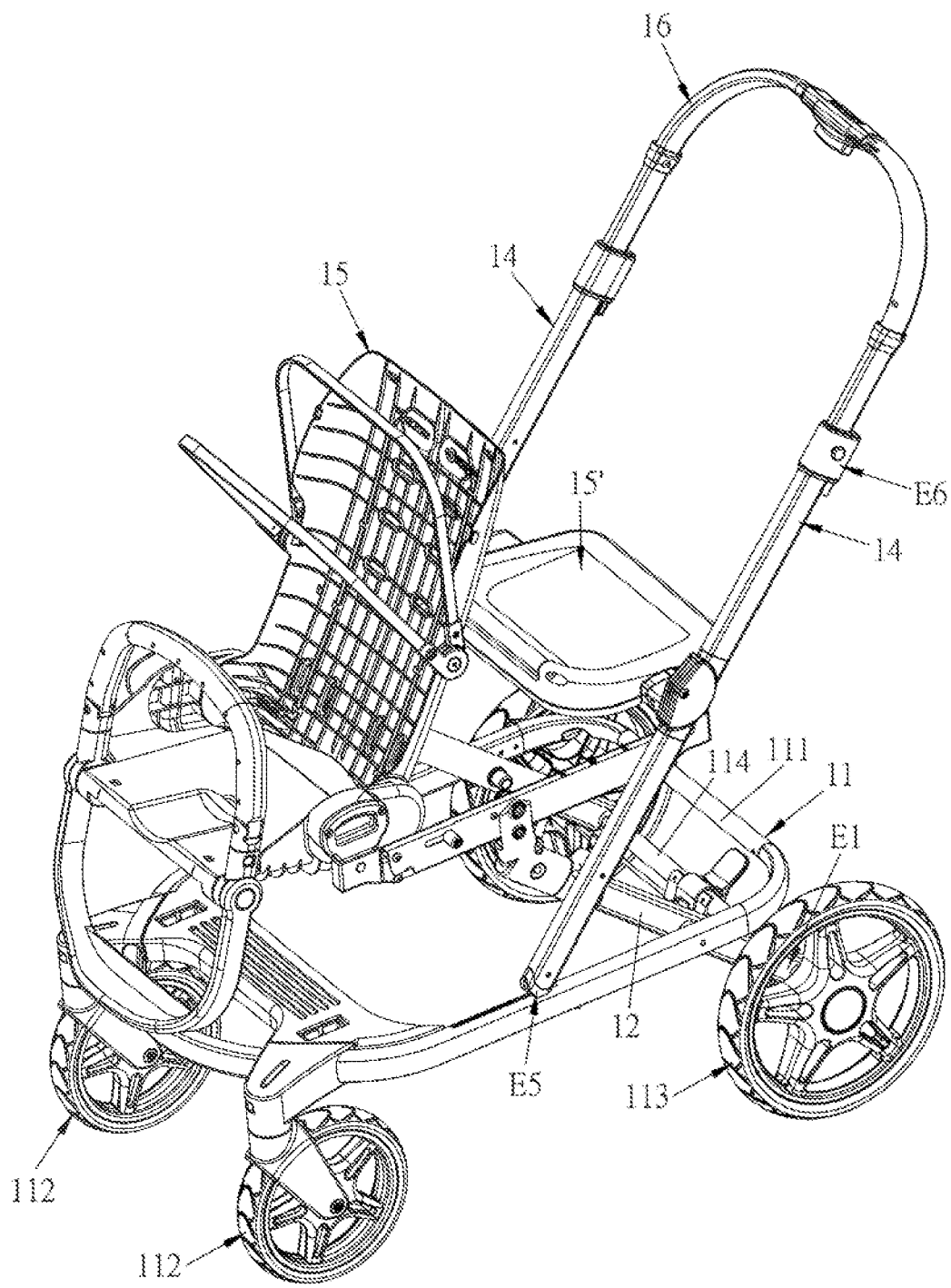
FIG. 2B is a schematic diagram showing a movable carrier according to another embodiment of this disclosure.
Figure 8:
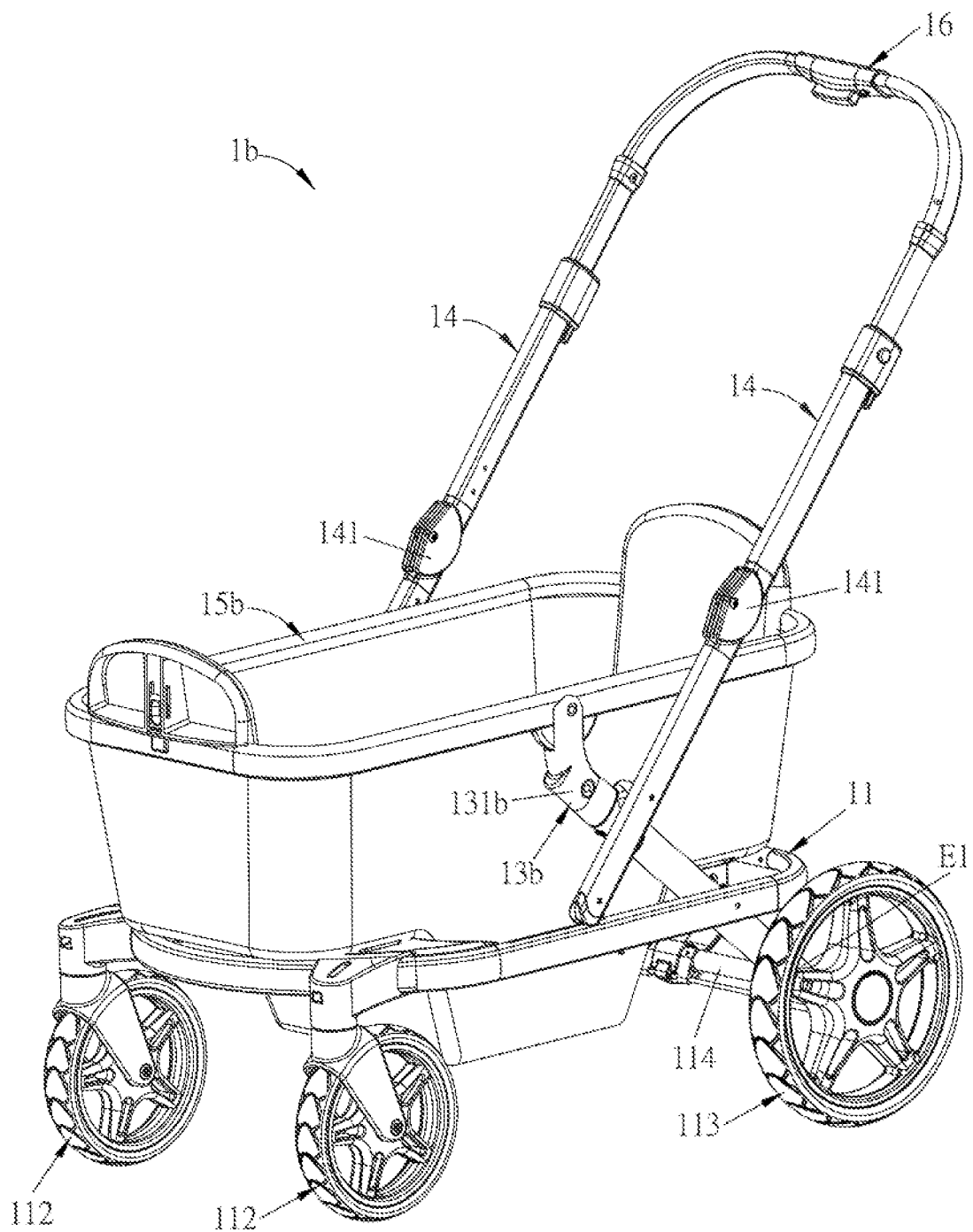

The carry members 15 are disposed on the first support members 12 by the link assemblies 13 as shown in FIG. 1. Herein, the two carry members 15 can be the same type or different types, and this disclosure is not limited. In this embodiment, the two carry members 15 are backless seats, shelves, carrycots, or storage baskets. Alternatively, as shown in FIG. 2B, one carry member 15 is a seat with a back, and the other carry member 15' is a backless seat. The carry members 15 can be any combination of the backless seat, shelf, carrycot, and storage basket depending on the requirement of the user, and this disclosure is not limited. If the two carry members 15 are both seats, the orientations of the seats can be adjusted based on the requirement of the user. For example, two infants sitting on the carry members 15 can both face forwardly (the direction toward the front wheel assembly 112), both face backwardly (the direction toward the rear wheel assembly 113), or be one facing forwardly and one facing backwardly. In addition, if the carry member 15 is a storage basket, the movable carrier can be used as a trailer or a pet stroller. To be noted, the term "storage basket" is an object having a bottom and a wall around the edge of the bottom, thereby forming a center accommodating space for storage. For example, as shown in FIG. 8, the carry member 15b of the movable carrier 1b is a typical storage basket of this disclosure.

Figure 3A:
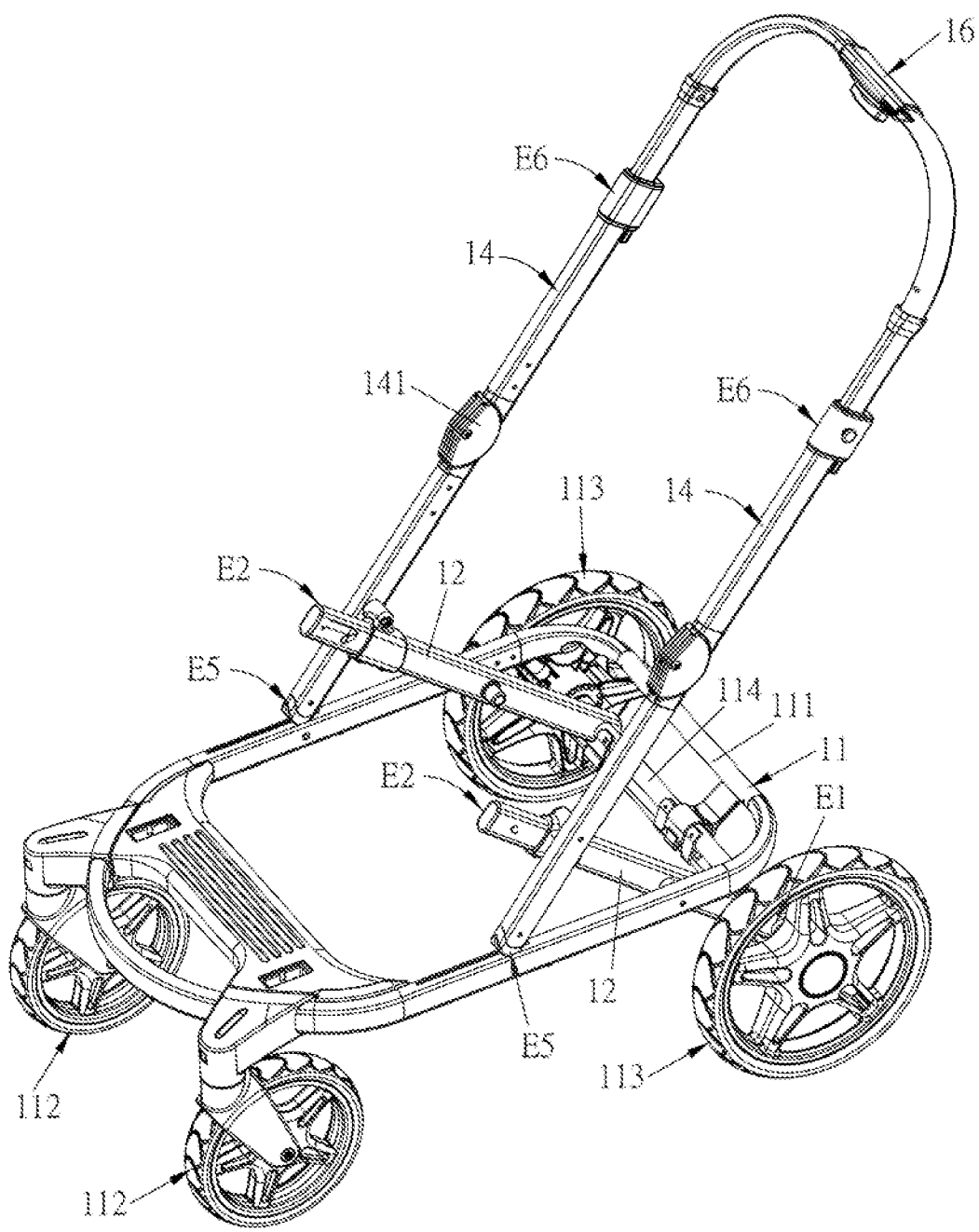
FIG. 3A is a schematic diagram showing the movable carrier of FIG. 2A without the link assembly.
Figure 3B:
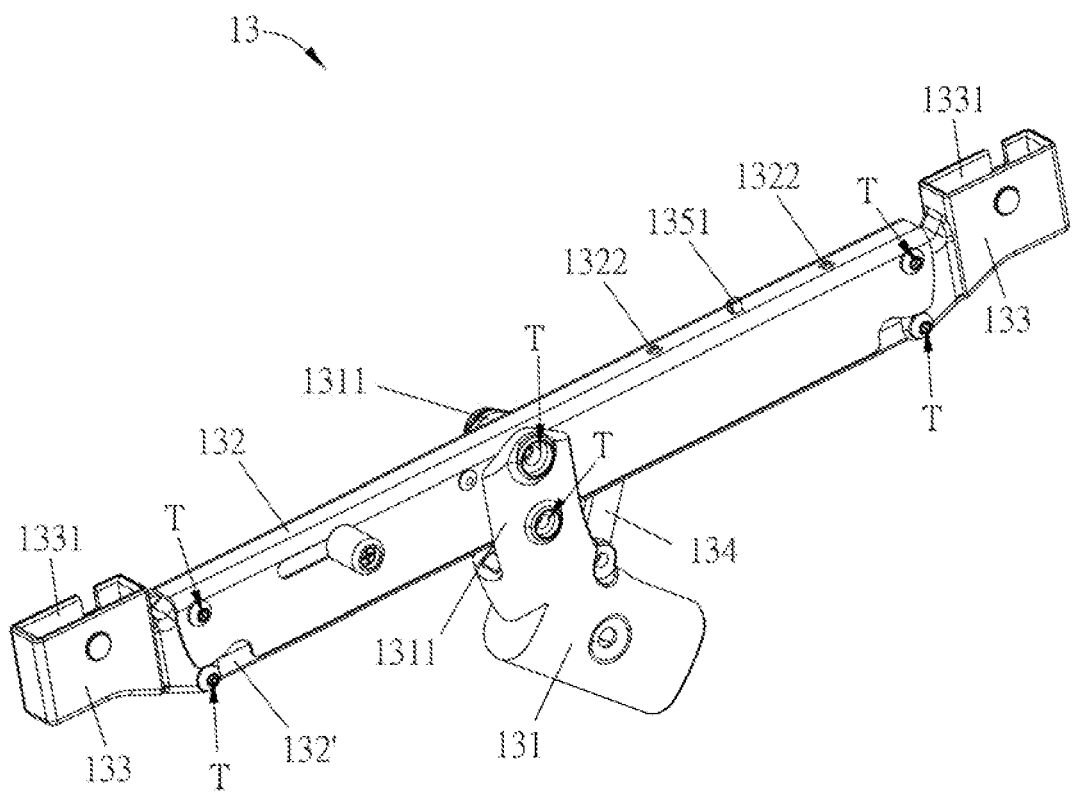
FIG. 3B is a schematic diagram showing the link assembly of the movable carrier of FIG. 2A.

The structure of the link assembly 13 will be described hereinafter with reference to FIGS. 3B and 3C. FIG. 3B is a schematic diagram showing the link assembly 13 of the movable carrier 1 of FIG. 2A, and FIG. 3C is an exploded view of the link assembly 13 of FIG. 3B.

The link assembly 13 is disposed corresponding to the first support member 12. In this embodiment, the link assembly 13 comprises a link member 131, a first connect member 132, a second connect member 132', and two adapter members 133. The link member 131 is disposed at the second end portion E2 of the first support member 12 (see FIG. 2A). The first connect member 132 and the second connect member 132' are disposed on the link member 131 in parallel. In this embodiment, one link assembly 13 and the corresponding first support member 12 are disposed at one side of the movable carrier 1, and another link assembly 13 and the corresponding first support member 12 are disposed at another side of the movable carrier 1. The link member 131 of each link assembly 13 is fixed to the second end portion E2 of the corresponding first support member 12 (see FIG. 2A).

Figure 3C:
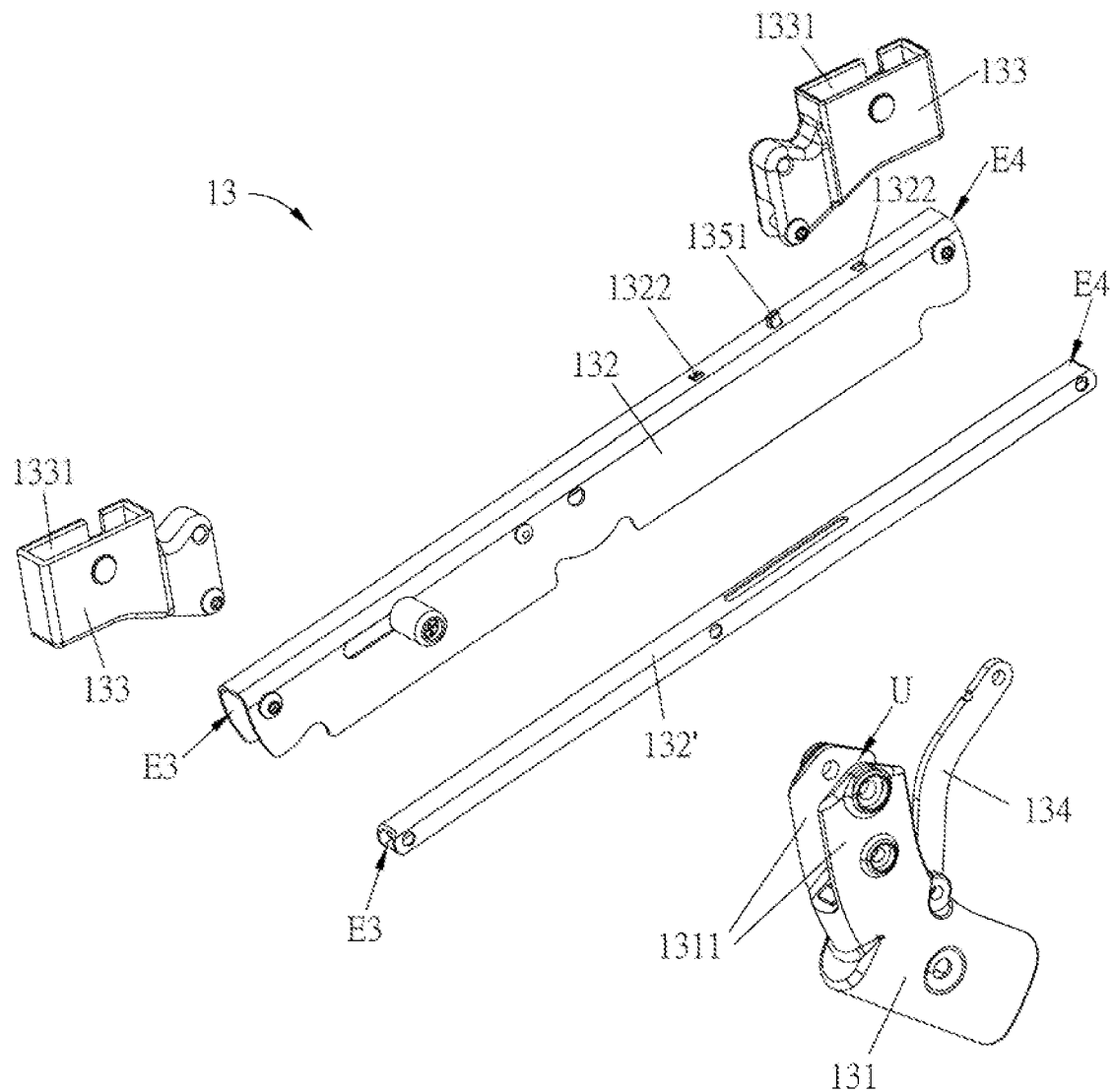
FIG. 3C is an exploded view of the link assembly of FIG. 3B.

As shown in FIGS. 3B and 3C, the link member 131 of this embodiment comprises two protruded link portions 1311, and a recess U is formed between the two link portions 1311. The first connect member 132 and the second connect member 132' are disposed in the recess U and pivotally connected with the link portions 1311, respectively. In this embodiment, the first connect member 132 is pivotally connected with the link portions 1311 through a pivot structure T (see FIG. 3B), and the second connect member 132' is pivotally connected with the link portions 1311 through another pivot structure T. Accordingly, the first connect member 132 and the second connect member 132' can change their positions with relative to the link portions 1311 via the corresponding pivot structures T. Moreover, the cross-section of the first connect member 132 is a reversed U shape, and the second connect member 132' is hidden in the inner side of the reversed U shape, so that the first connect member 132 and the second connect member 132' not only provide the connecting function but also the functions of pretty profile and avoiding clipping.

Figure 4A:
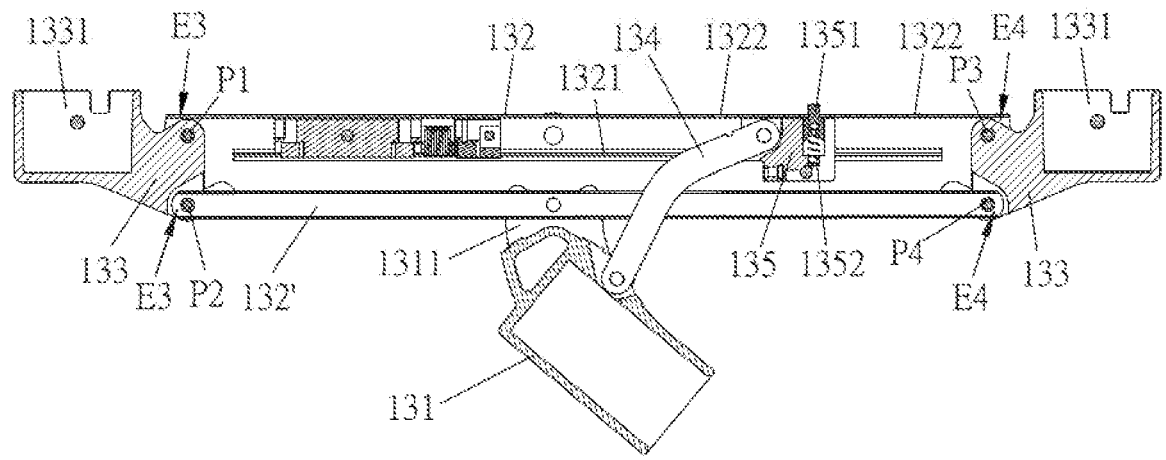
FIGS. 4A and 4B are different sectional views of the link assembly of FIG. 3B.
Figure 4B:
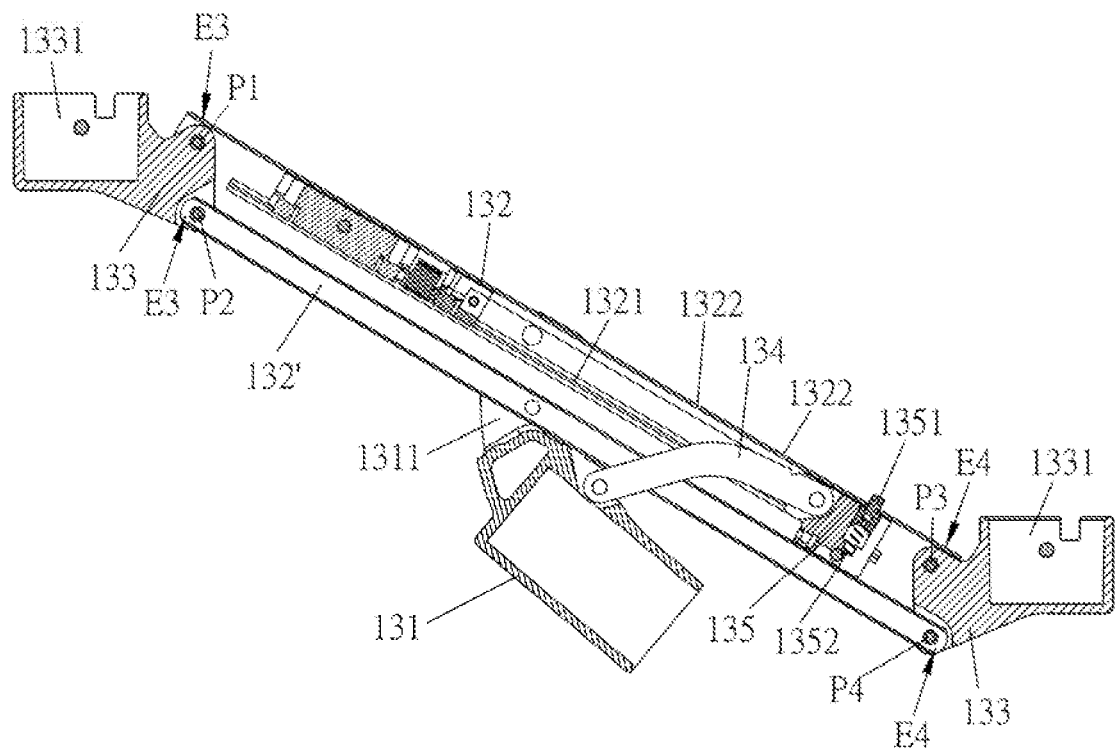
Figure 5A:
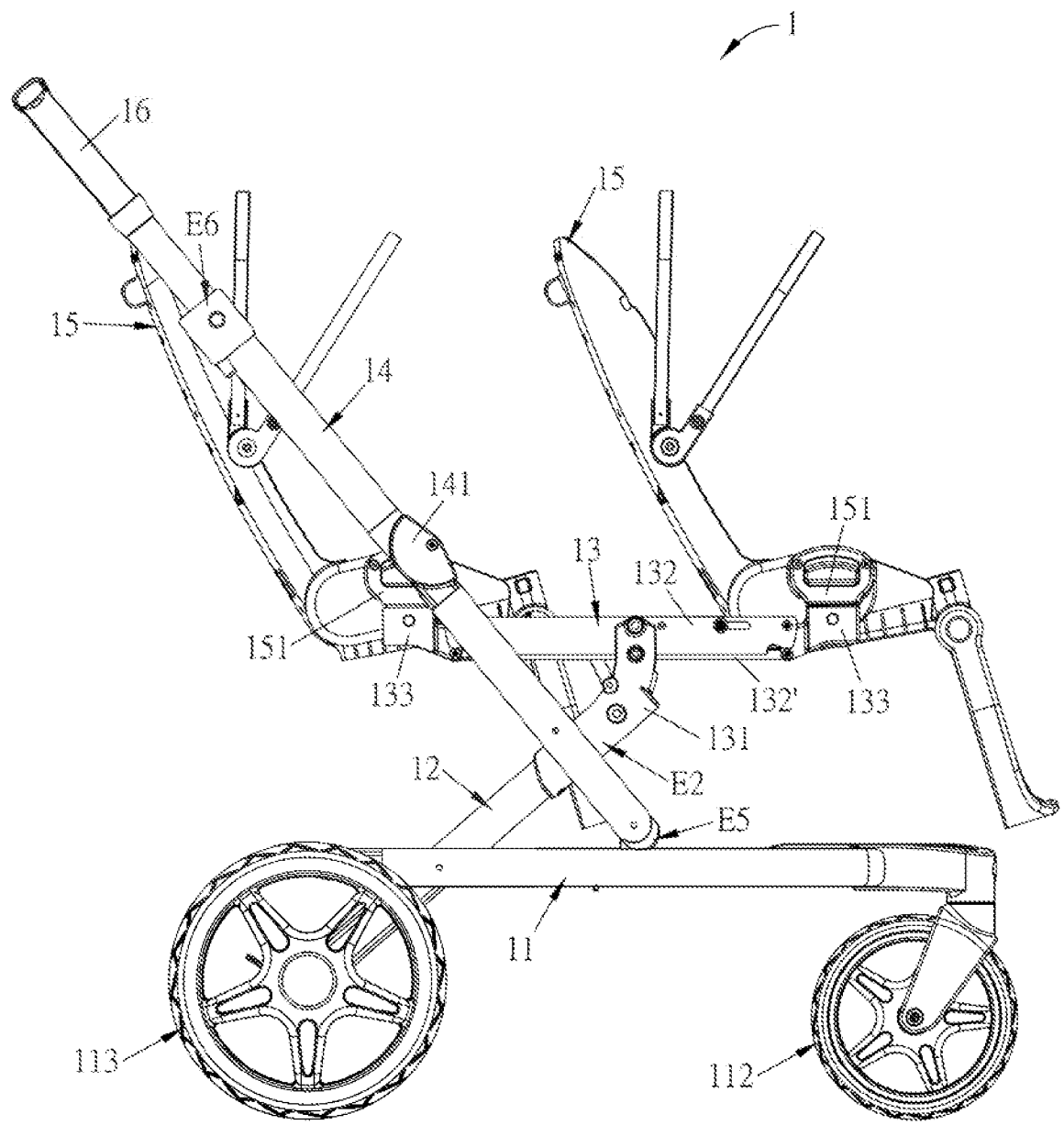
FIGS. 5A and 5B are schematic diagrams of the movable carrier of the embodiment, wherein the carry members are at different positions.
Figure 5B:
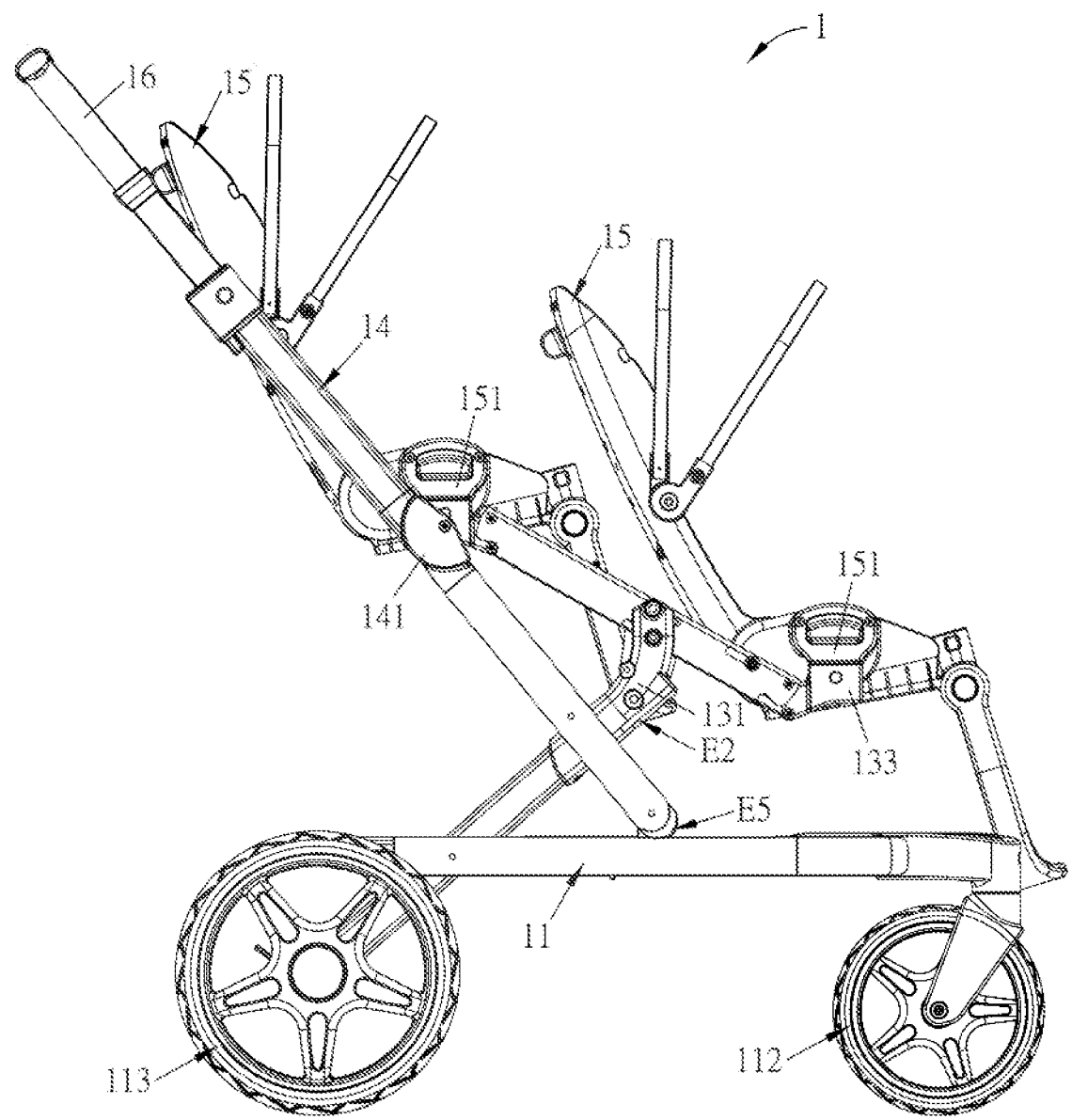
Figure 5C:
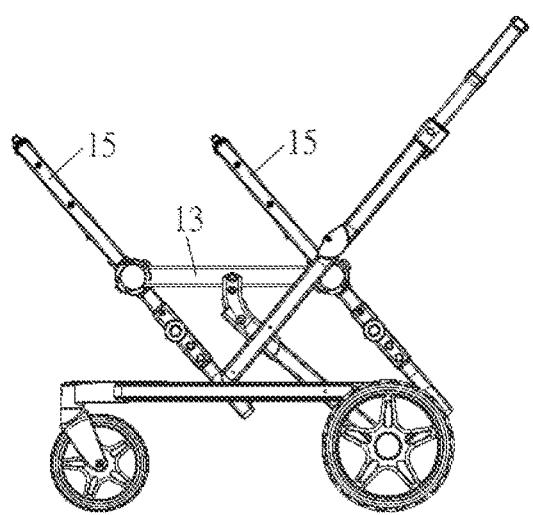
FIGS. 5C to 5N are schematic diagrams showing the link assembly and the carry members of the movable carrier of the embodiment in different relative positions.
Figure 5D:
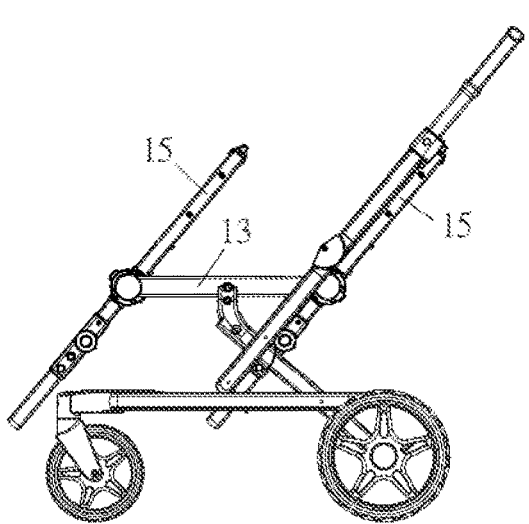
Figure 5E:
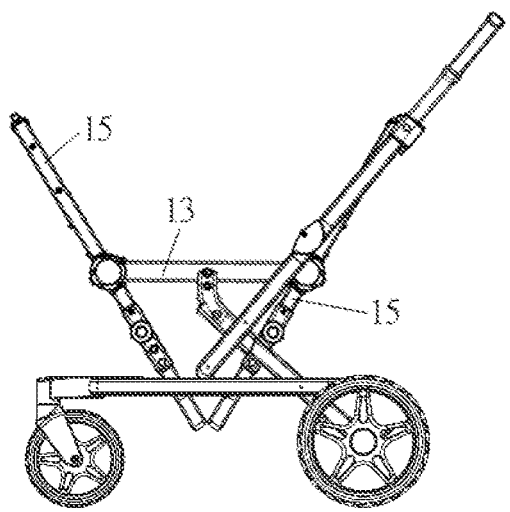
Figure 5F:
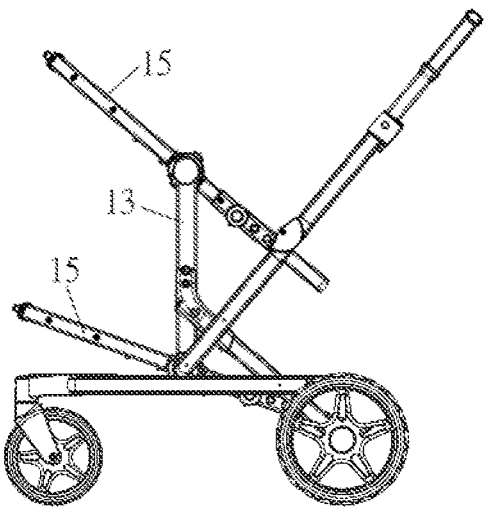
Figure 5G:
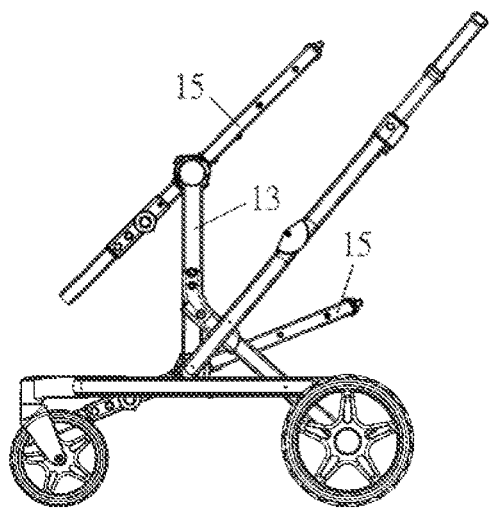
Figure 5H:
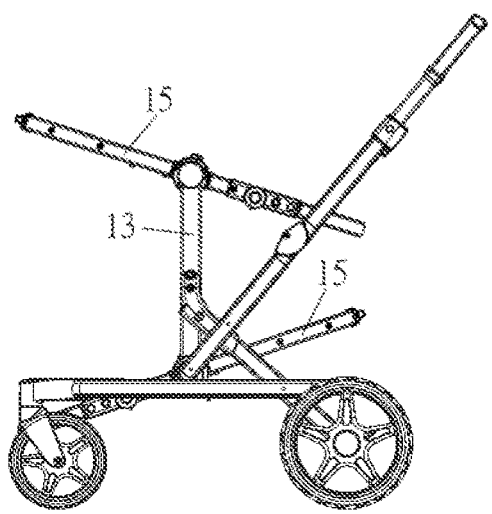
Figure 5I:
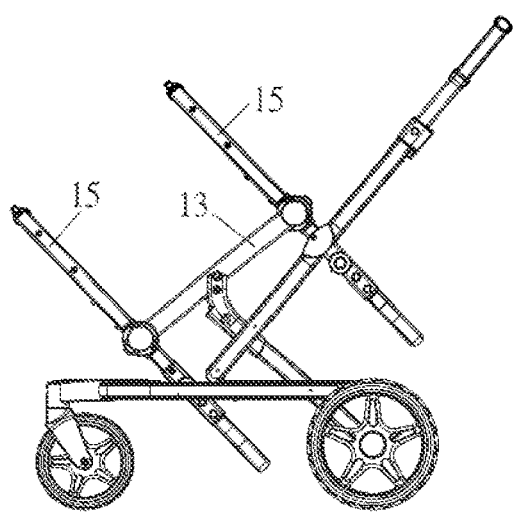
Figure 5J:
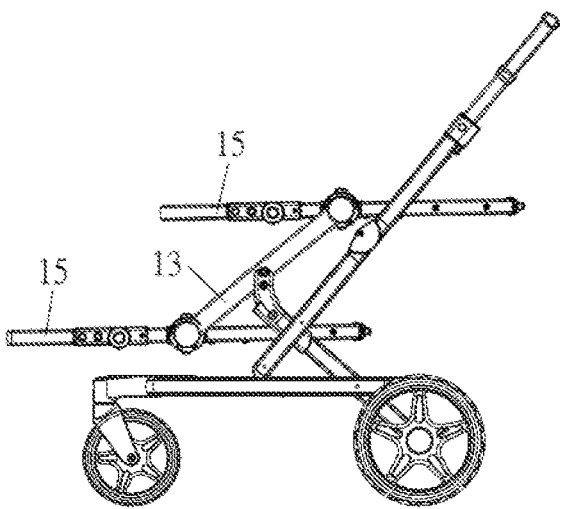
Figure 5K:
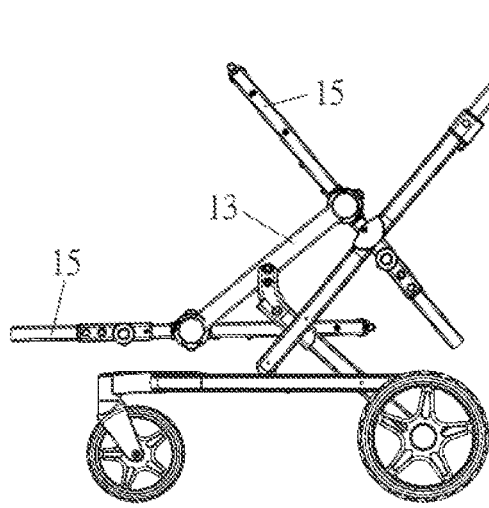
Figure 5L:
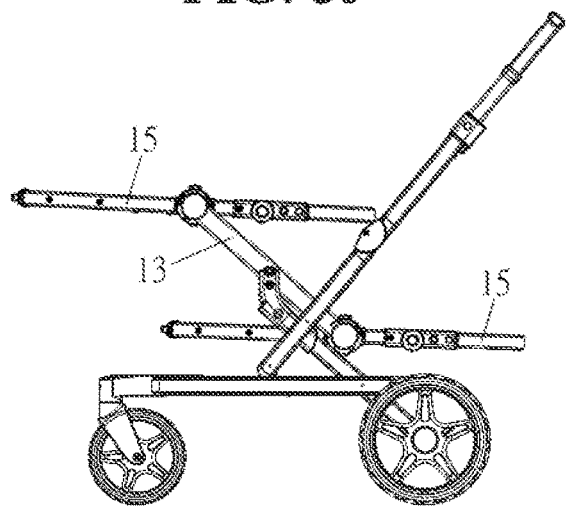
Figure 5M:
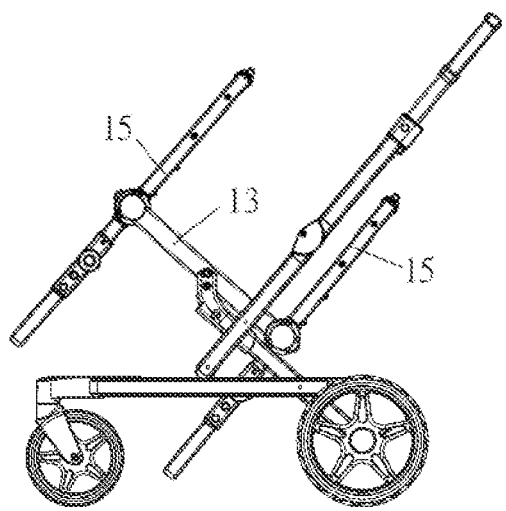
Figure 5N:
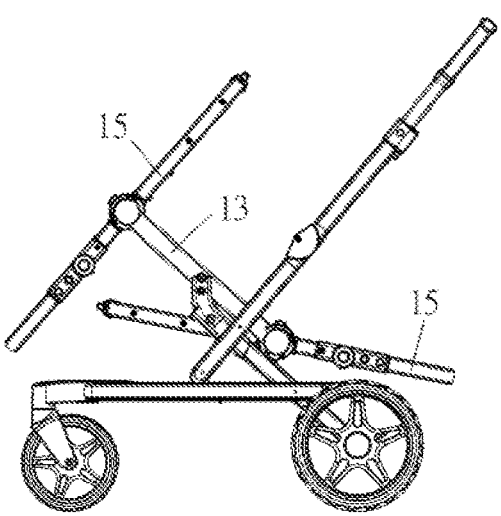

FIGS. 4A and 4B are different sectional views of the link assembly 13 of FIG. 3B, and FIGS. 5A and 5B are schematic diagrams of the movable carrier 1 of the embodiment, wherein the two carry members 15 are at different positions.

Referring to FIGS. 4A and 4B in view of FIGS. 5A and 5B, the link assembly 13 of this embodiment further comprises a third connect member 134. One end of the third connect member 134 connects to the link member 131, and the other end of the third connect member 134 is slidingly disposed on the first connect member 132. Accordingly, in the process of changing the positions of the first connect member 132 and the second connect member 132' with relative to the link member 131, the displacement of the link member 131 and the first connect member 132 (and the second connect member 132') can be limited. In order to allow the other end of the third connect member 134 be slidingly disposed on the first connect member 132, the link assembly 13 of this embodiment further comprises a position member 135, and the first connect member 132 further comprises a sliding track 1321. The position member 135 connects to the other end of the third connect member 134 away from the link member 131, and the third connect member 134 is slidingly disposed on the sliding track 1321 of the first connect member 132 by the position member 135.

In addition, the first connect member 132 of this embodiment further comprises a plurality of position holes 1322, and the position member 135 comprises a position portion 1351 and an elastic member 1352. The position portion 1351 is disposed corresponding to one of the position holes 1322. In this case, there are three position holes 1322 configured on the first connect member 132, and the position portion 1351 is a bump. This disclosure is not limited thereto. In other embodiments, the numbers and aspects of the position portion 1351 and the position holes 1322 can be different. Besides, in this embodiment, the position holes 1322 have equivalent intervals. Of course, in other embodiments, the position holes 1322 may have nonequivalent intervals.

The position portion 1351 is connected with the elastic member 1352, and the position portion 1351 can be inserted into the position hole 1322 via the elastic member 1352. Specifically, when the third connect member 134 slides on the sliding track 1321 of the first connect member 132 via the position member 135, the elastic member 1352 of the position member 135 can push the position portion 1351 so as to insert the position portion 1351 into the position hole 1322 of the first connect member 132, thereby fixing the relative positions of the first connect member 132 (and the second connect member 132') and the link member 131. Accordingly, the position of the link assembly 13 does not change with relative to the first support member 12, and the angle of the link assembly 13 can be fixed. In addition, when the position member 135 slides on the sliding track 1321, the position portion 1351 of the position member 135 can be fixed to one of the three position holes 1322 (stage sliding), but this disclosure is not limited thereto. In other embodiments, the position member 135 can freely slide on the sliding track 1321 in a stage-less sliding. In this case, the position member 135 can slide on the sliding track 1321 to any position, and then the user can use a screw or a locking mechanism to fix the relative positions of the position member 135 and the first connect member 132 (and the second connect member 132'). This disclosure is not limited thereto.

In addition, the first connect member 132 and the second connect member 132' can be pivotally connected to the two link portions 1311, respectively. Two adapter members 133 are disposed corresponding to the ends of the first connect member 132 and the second connect member 132', and each of the adapter members 133 has an adapter portion 1331. Specifically, each of the first connect member 132 and the second connect member 132' has a third end portion E3 and a fourth end portion E4, the third end portion E3 of the first connect member 132 is located corresponding to the third end portion E3 of the second connect member 132', and the fourth end portion E4 of the first connect member 132 is located corresponding to the fourth end portion E4 of the second connect member 132'. One adapter member 133 connects to both of the third end portion E3 of the first connect member 132 and the third end portion E3 of the second connect member 132', and the other adapter member 133 connects to both of the fourth end portion E4 of the first connect member 132 and the fourth end portion E4 of the second connect member 132'. In this embodiment, one adapter member 133 is pivotally connected with the third end portions E3 of the first connect member 132 and the second connect member 132', and the other adapter member 133 is pivotally connected with the fourth end portions E4 of the first connect member 132 and the second connect member 132'. To be noted, in the link assembly 13, when two components are pivotally connected via the pivot structure T, the relative positions of the two components can be changed about the pivot structure T (e.g. relative rotation). The components pivotally connected via the pivot structure T can be referred to FIG. 3B.

In addition, each adapter member 133 comprises an adapter portion 1331, and the carry member 15 has a connect portion 151 disposed at one side of the carry member 15 (see FIG. 5A). Each connect portion 151 is located corresponding to each adapter portion 1331. In this embodiment, the carry member 15 has two sides, and the connect portions 151 disposed at the two sides are located corresponding to the two adapter portions 1331. Herein, the adapter portion 1331 can comprise a recess, a protrusion, an engage member, a lock member, a screw, a screw hole, or any combination thereof, and the connect portion 151 can comprise any structure corresponding to the adapter portion 1331. Accordingly, the adapter portion 1331 and the corresponding connect portion 151 can be firmly connected. In this embodiment, the adapter portion 1331 is a recess, and the connect portion 151 is a protrusion corresponding to the recess, so that the adapter portion 1331 can be tightly connected with the connect portion 151. Moreover, in order to more firmly connect the adapter portion 1331 and the connect portion 151, when the connect portion 151 is inserted into the corresponding adapter portion 1331, the connect portion 151 can be fastened on the adapter member 133 by, for example, screws. This configuration can further firmly connect the two carry members 15 to the two link assemblies 13.

As shown in FIGS. 4A and 4B, the positions of the first connect member 132 and the second connect member 132' can be changed with relative to the link members 131, which means that the positions of the first connect member 132 and the second connect member 132' can be changed with relative to the first support member 12. In this embodiment, in the process of changing the relative positions of the first connect member 132 and the second connect member 132' with relative to the link members 131, the adapter portions 1331 of the link assemblies 13 are all oriented to the same direction. In other words, regarding the link assembly 13 of FIGS. 4A and 4B, in the process of rotating the first connect member 132 and the second connect member 132' in clockwise with relative to the link member 131 (from the position of FIG. 4A to the position of FIG. 4B), the two adapter portions 1331 (recesses) are all oriented to the same direction (e.g. upward direction). Of course, in the process of rotating the first connect member 132 and the second connect member 132' in counterclockwise with relative to the link member 131, the two adapter portions 1331 (recesses) are also all oriented to the same direction (e.g. upward direction). In this embodiment, the first connect member 132, the second connect member 132' and the two adapter members 133 are connected to form a parallelogram structure, which has four joints P1~P4 (pivot points). When the positions of the first connect member 132 and the second connect member 132' are changed with relative to the link member 131 (rotation), the four joints P1~P4 of the parallelogram structure can limit the movements of the first connect member 132 and the second connect member 132', so that the first connect member 132 and the second connect member 132' always remain in parallel during the rotation process, and the two adapter portions 1331 are all oriented to the same direction.

The positions of the link assemblies 13 as shown in FIGS. 5A and 5B are corresponding to FIGS. 4A and 4B. As shown in FIGS. 5A and 5B, in the process of rotating the link assemblies 13, since the adapter portions 1331 are all oriented to the same direction (upward direction), the two carry members 15 can be maintained in the same upward direction, so that the passengers can still sit on the carry members 15. FIG. 5A shows that the two carry members 15 are located on the same horizontal plane, and FIG. 5B shows that the rear carry member 15 is higher than the front carry member 15. To be noted, the link assemblies 13 can be rotated in clockwise from the position of FIG. 5A to the position of FIG. 5B. Of course, the link assemblies 13 can also be rotated in counterclockwise to make the front carry member 15 higher than the rear carry member 15, and this disclosure is not limited. Accordingly, the movable carrier 1 of this embodiment has two carry members 15, which are position changeable, so that the relative positions of the two carry members 15 can be changed according to the requirements of the user. To be noted, when the user changes the positions of the two carry members 15 of the movable carrier 1, the relative positions of the first connect member 132 and the second connect member 132' with relative to the link member 131 can be fixed by inserting the position portion 1351 to the position hole 1322. Accordingly, the relative positions of the two carry members 15 can be fixed. This configuration can prevent the risk of passenger falling caused by the unstable carry members 15 during the moving period of the movable carrier 1.

In some applications, the relative positions of the link assemblies and the carry members of the movable carrier can be changed. For example, as shown in FIGS. 5C to 5N (in the side view), the link assemblies 13 can be in vertical or tilt with relative to the ground, and the two carry members 15 can also be rotated to the vertical or tilt status. Therefore, the positions of the link assemblies 13 and the carry members 15 can have various combinations for satisfying various requirements of different users.

Figure 6A:
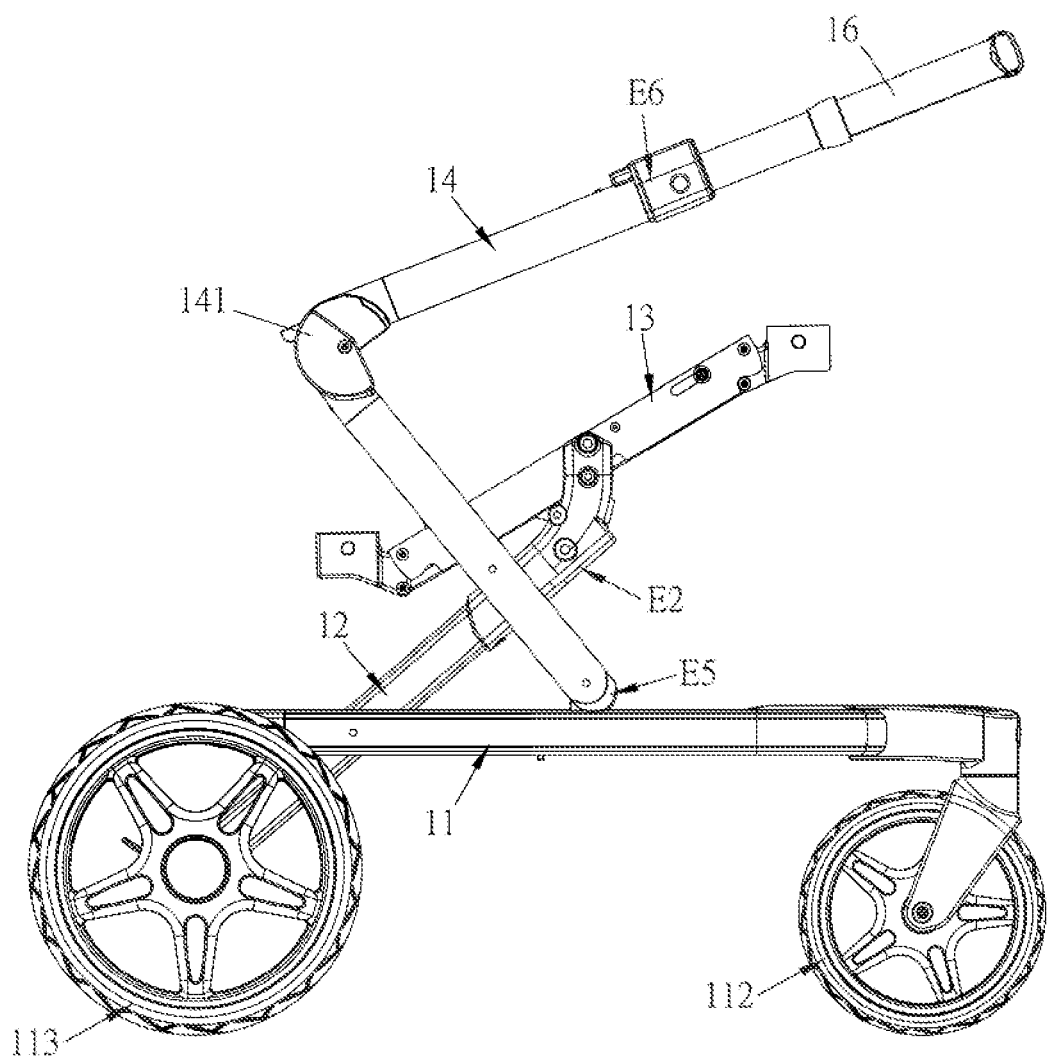
FIGS. 6A to 6C are schematic diagrams showing the folding procedure of the movable carrier of FIG. 5A.
Figure 6B:
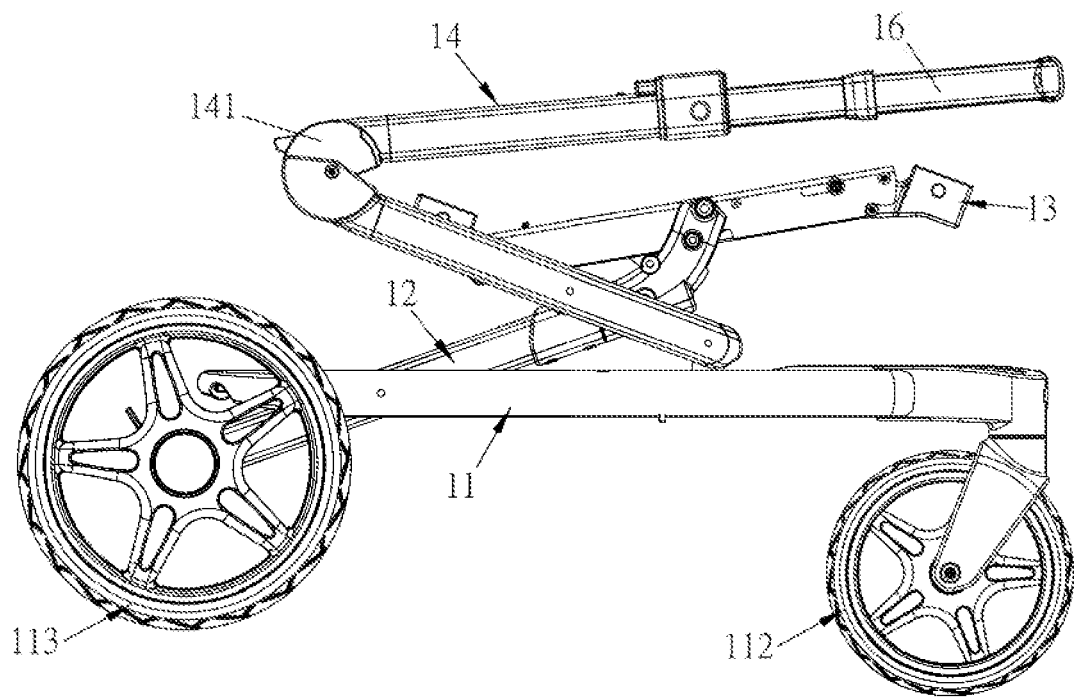
Figure 6C:
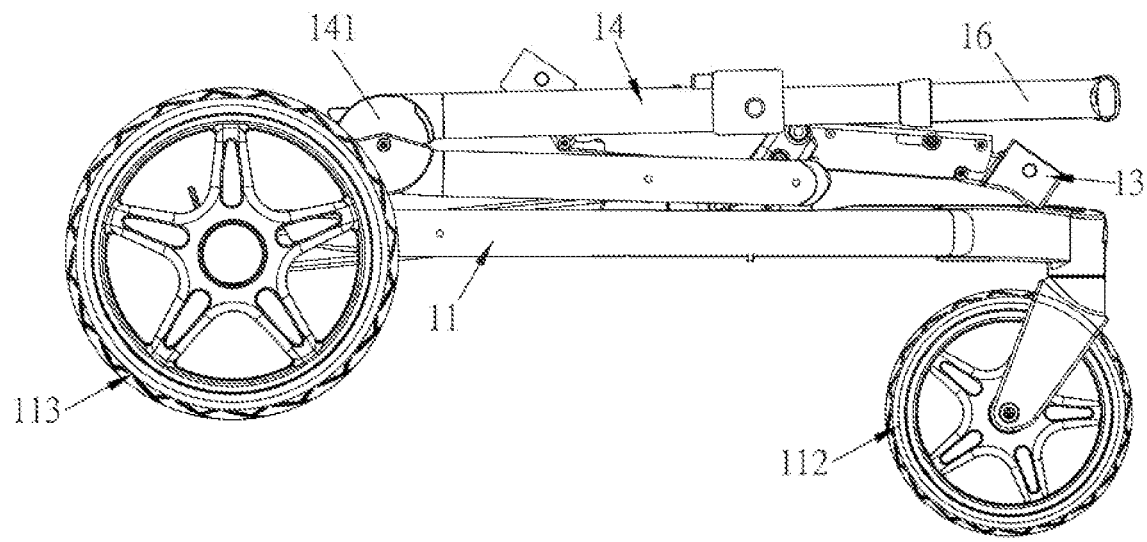

FIGS. 6A to 6C are schematic diagrams showing the folding procedure of the movable carrier 1 of FIG. 5A. To be noted, the carry members 15 are not shown in the movable carrier 1 of FIGS. 6A to 6C. In addition, the structure of the movable carrier 1 has been described in the above embodiment, so the details thereof will be omitted.

The folding method for the movable carrier 1 of this embodiment comprises the following steps.

In the step 1, the two carry members 15 are separated from the link assemblies 13, so that the movable carrier 1 does not contain the carry members 15.

In the step 2, as shown in FIG. 6A, the second support member 14 is folded about a folding pivot portion 141 of the second support member 14 toward the bottom frame assembly 11. Thus, the second support member 14 can be pushed toward the bottom frame assembly 11.

In the step 3, the folded second support member 14 (including the handlebar frame 16) is continuously pushed toward the bottom frame assembly 11 until the second support member 14 is parallel to the bottom frame assembly 11 (see FIG. 6C). In the folding process, the adapter portions 133 are all oriented to the same direction, and the first connect member 132 and the second connect member 132' remain in parallel to each other. In addition, when the second support member 14 is pushed toward the bottom frame assembly 11, the first support member 12 and the link assembly 13 can be carried to move downwardly, so that the first support member 12 and the link assembly 13 are all moved toward the bottom frame assembly 11. The folded movable carrier 1 has a smaller occupied space, and it is convenient for storage and carrying the movable carrier 1.

Figure 7A:
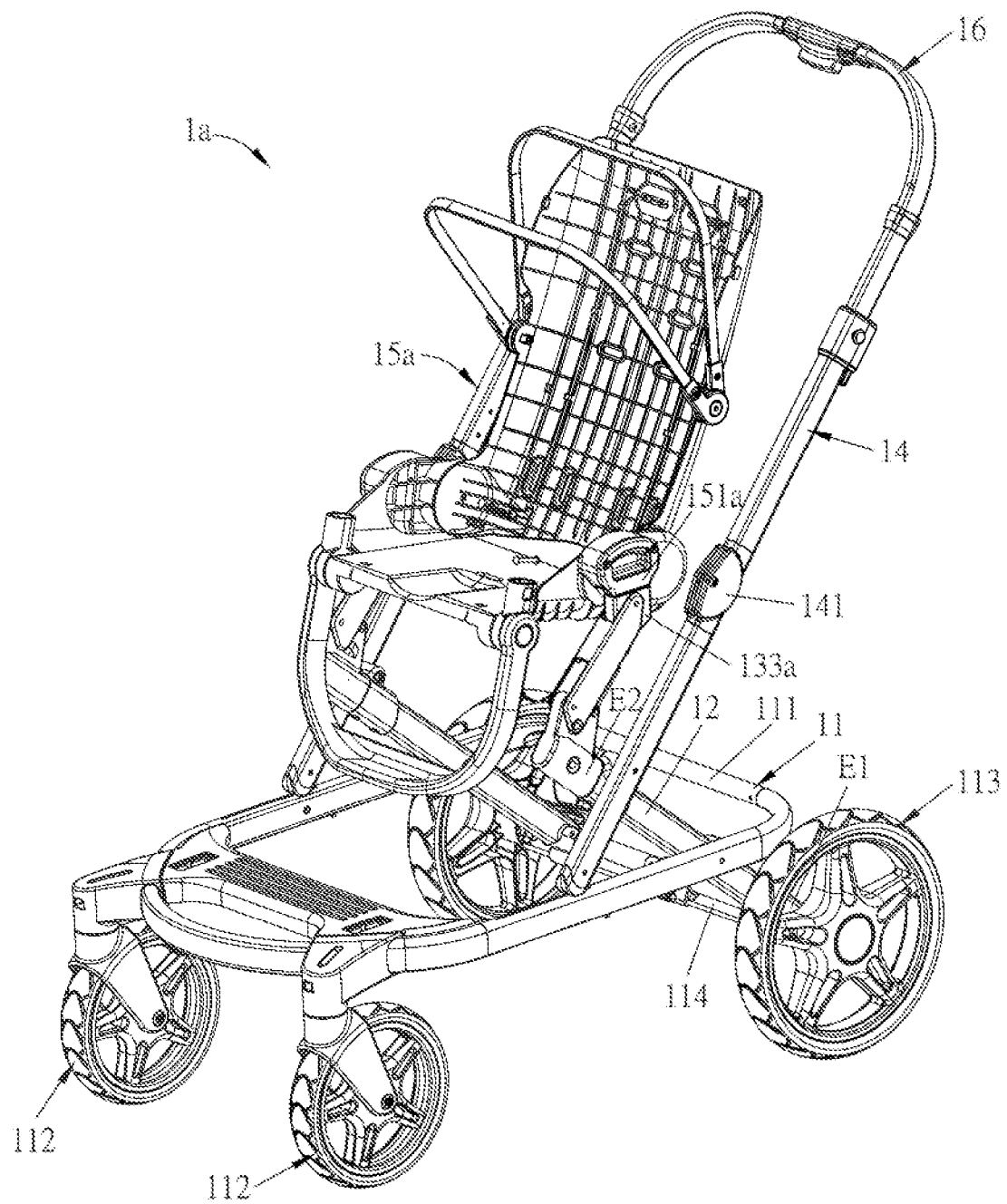
FIGS. 7A, 7B and 8 are schematic diagrams showing the movable carriers according to different embodiments of this disclosure.
Figure 7B:
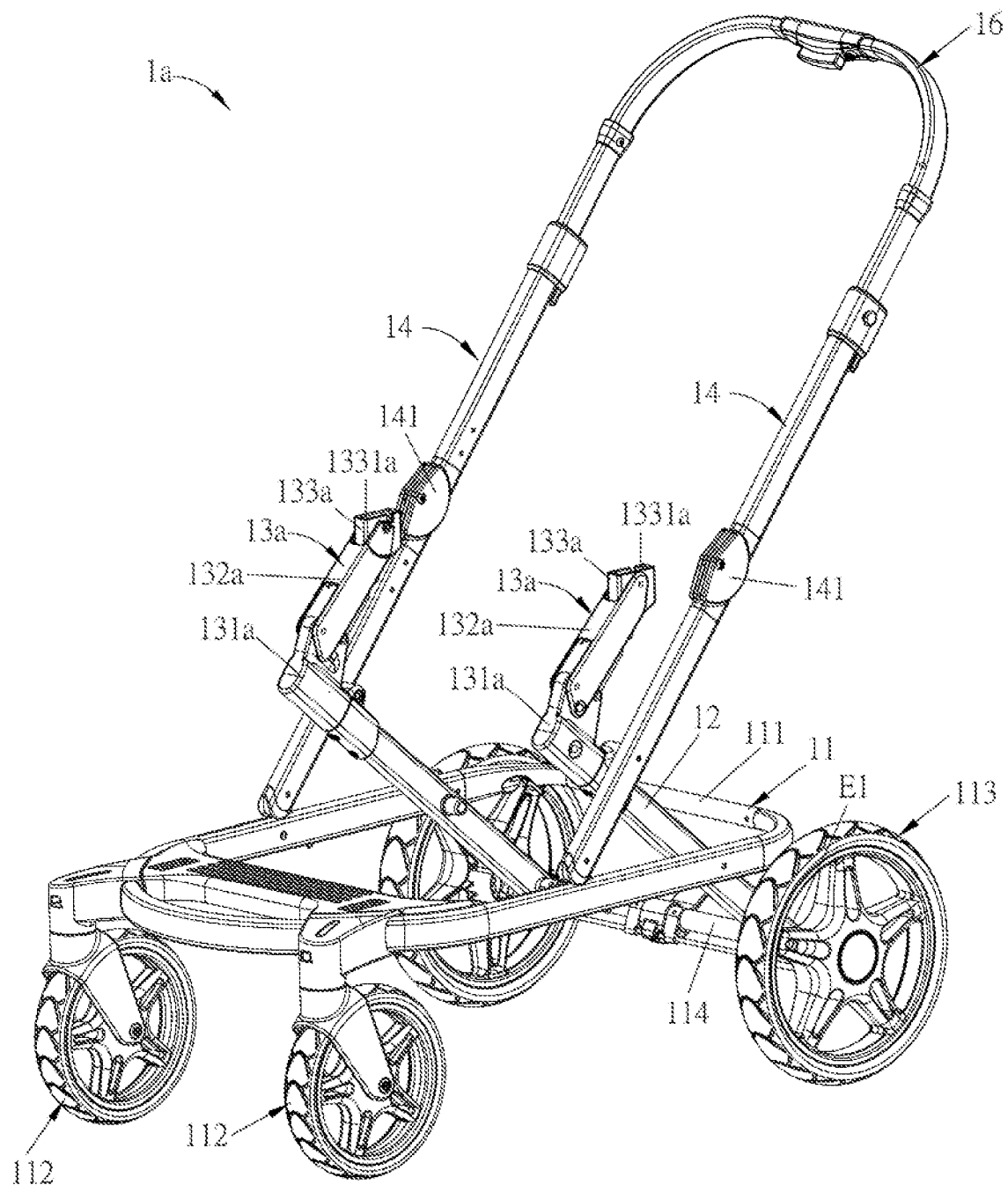

FIGS. 7A, 7B and 8 are schematic diagrams showing the movable carriers 1a and 1b according to different embodiments of this disclosure. FIG. 7A shows the movable carrier 1a, and FIG. 7B shows the movable carrier 1a of FIG. 7A without the carry members 15a.

As shown in FIGS. 7A and 7B, the movable carrier 1a of this embodiment is substantially the same as the movable carrier 1 of the previous embodiment, but the link assembly 13a of the movable carrier 1a is different from the link assembly 13 of the movable carrier 1. In this embodiment, each link assembly 13a comprises a link member 131a, a connect member 132a and an adapter member 133a. The link member 131a is disposed at the second end portion E2 of the first support member 12 (see FIG. 7A). The connect member 132a is disposed on the link member 131a, and connected to the second end portion E2 of the first support member 12 through the link member 131a. In addition, the movable carrier 1a of this embodiment comprises, for example, one carry member 15a (seat). As shown in FIGS. 7A and 7B, each of the adapter members 133a disposed at two sides of the carry member 15a comprises an adapter portion 1331a, and the carry member 15a comprises connect portions 151a disposed at two sides of the carry member 15a (see FIG. 7A). The connect portions 151a are disposed corresponding to the adapter portion 1331a, respectively.

As shown in FIG. 8, the movable carrier 1b of this embodiment is substantially the same as the movable carrier 1 of the previous embodiment. Different from the movable carrier 1, each of the link assemblies 13b of the movable carrier 1b of this embodiment comprises one link member 131b only. In addition, the movable carrier 1b of this embodiment comprises, for example, one carry member 15b, such as a storage basket. In this case, the movable carrier 1b can be used as a pet stroller. The carry member 15b comprises two link assemblies 13b disposed at two sides of the carry member 15b, and each of the link assemblies 13b is connected with the second end portion E2 of each first support member 12 through the corresponding link member 131b (and/or screws).

As mentioned above, it is very simple to change the carry mode of the movable carriers 1, 1a and 1b. For example, the proper link assembly or link assemblies can be installed so as to substitute the two seats by a single seat, or to change another type of carry member. Accordingly, the movable carrier of the disclosure also has the characteristics of easily changing the carrying mode and having various carrying modes.

Figure 9A:
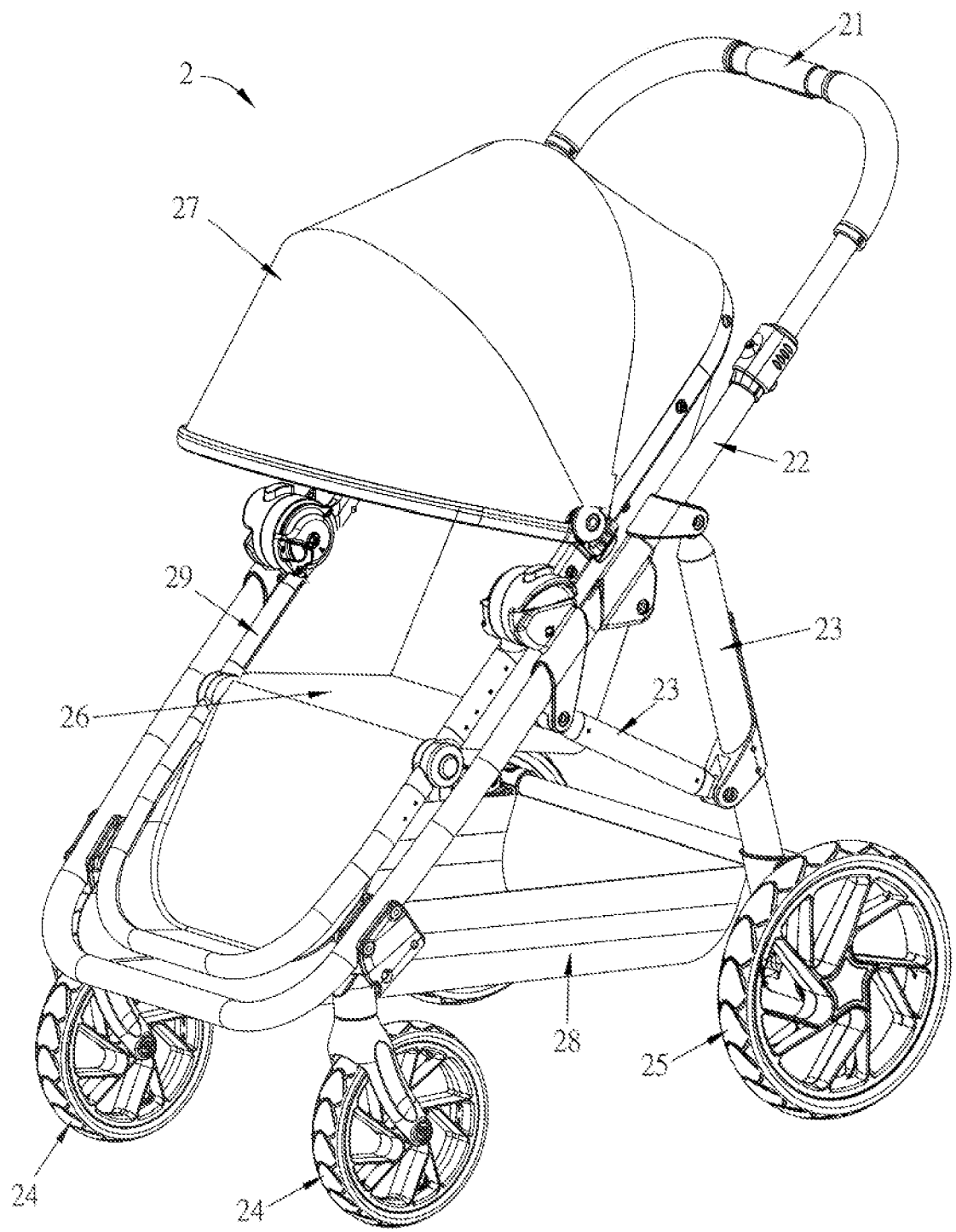
FIG. 9A is a schematic diagram showing a movable carrier according to another embodiment of this disclosure.

FIG. 9A is a schematic diagram showing a movable carrier 2 according to another embodiment of this disclosure. In this embodiment, the movable carrier 2 is, for example, a single-seat stroller, which comprises one handlebar frame 21, two support frames 22, two bottom frames 23, two front wheel assemblies 24, two rear wheel assemblies 25, one carry member 26, one top canopy 27, one storage member 28, and one seat frame 29. The support frames 22 and the bottom frames 23 together form a bracket. The support frames 22 are connected with the bottom frames 23.

Figure 9B:
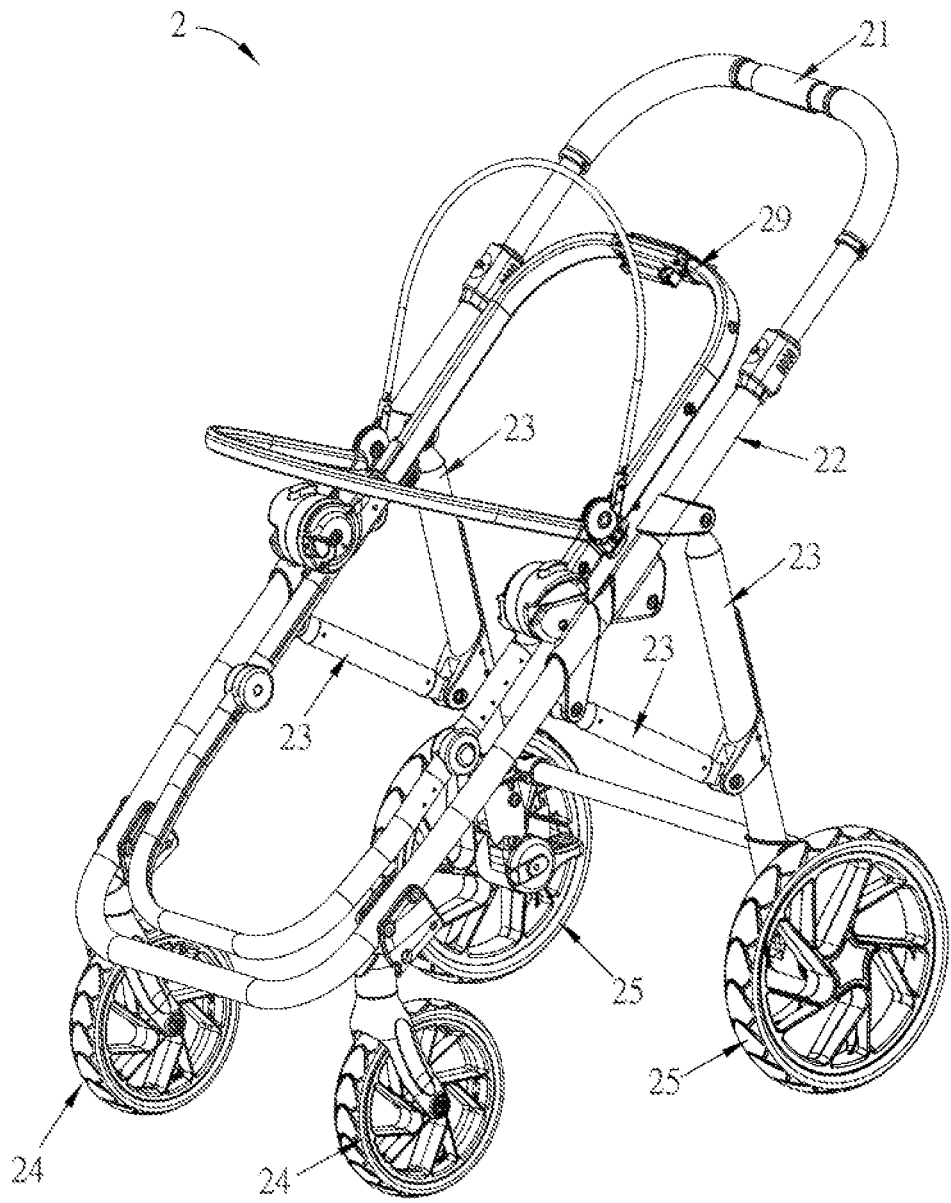
FIG. 9B is a schematic diagram showing the movable carrier of FIG. 9A, wherein the carry member, the top canopy and the storage member are removed.

Two ends of the handlebar frame 21 are connected with the two support frames 22, respectively. The seat frame 29 is installed on the bracket (the support frames 22 and the bottom frames 23), and the top canopy 27 and the carry member 26 are installed on the seat frame 29. In this embodiment, the carry member 26, the top canopy 27 and the storage member 28 are detachable with relative to the bottom frame 23. FIG. 9B is a schematic diagram showing the movable carrier 2 of FIG. 9A, wherein the carry member 26, the top canopy 27 and the storage member 28 are removed.

In some embodiments, the movable carrier 2 can be converted into a baby trailer, which can be connected behind, for example, a bicycle by a tow bar. Two embodiments of converting the movable carrier 2 into the baby trailer will be described hereinafter.

Figure 10A:
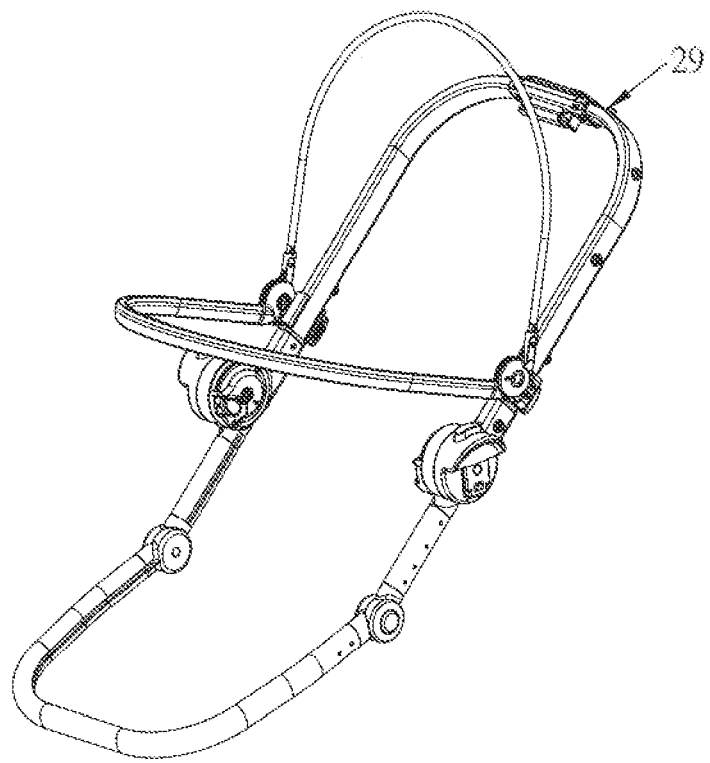
FIGS. 10A to 10E are schematic diagrams showing a first embodiment of converting the movable carrier of this disclosure to a baby trailer.
Figure 10B:
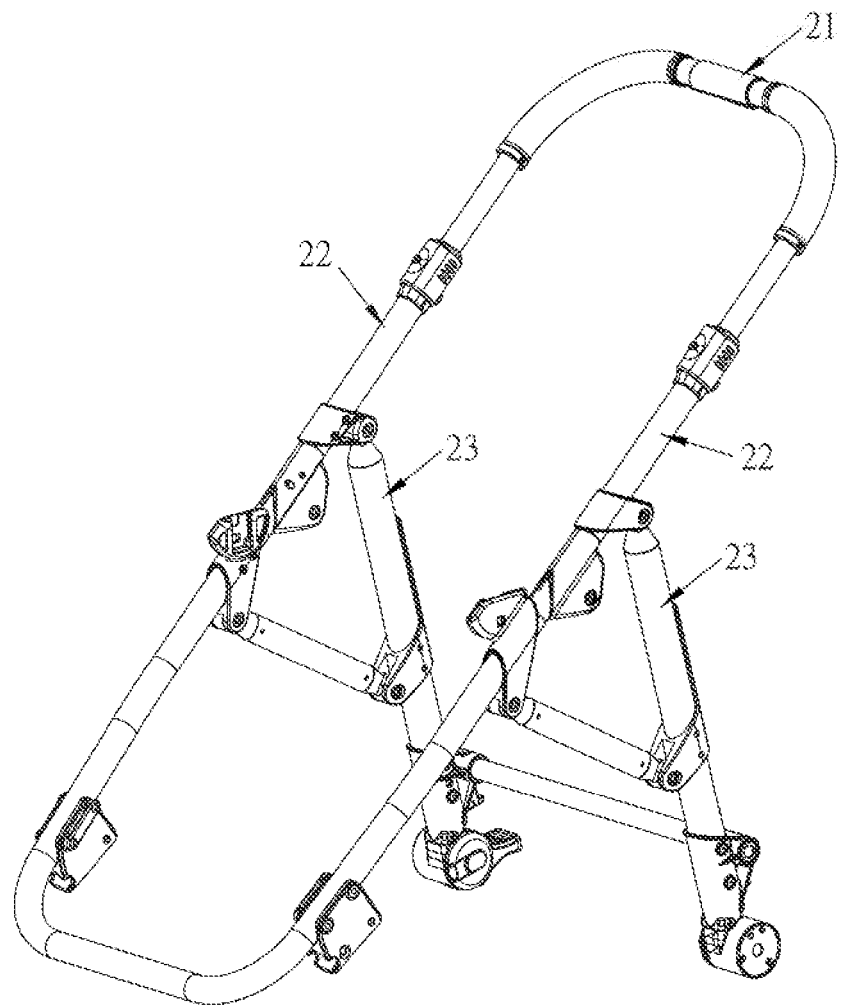
Figure 10C:
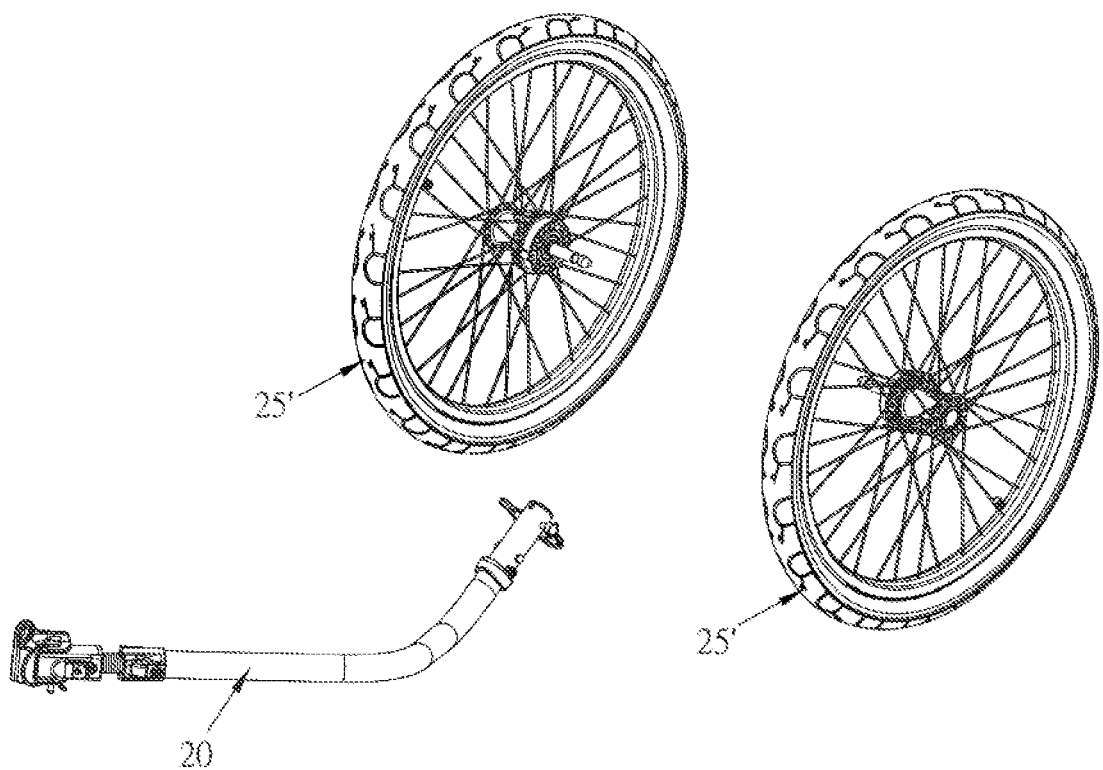
Figure 10D:
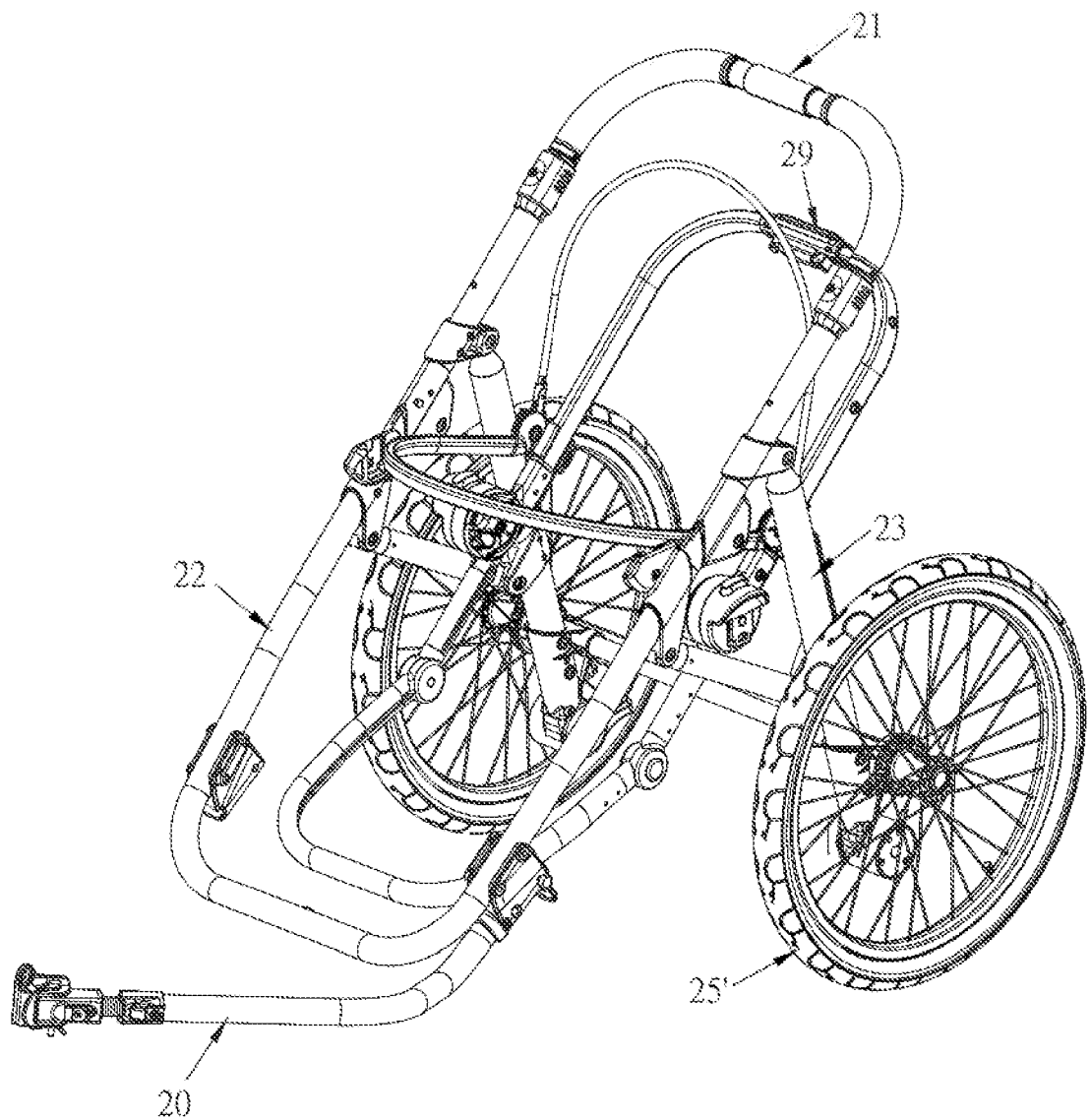
Figure 10E:
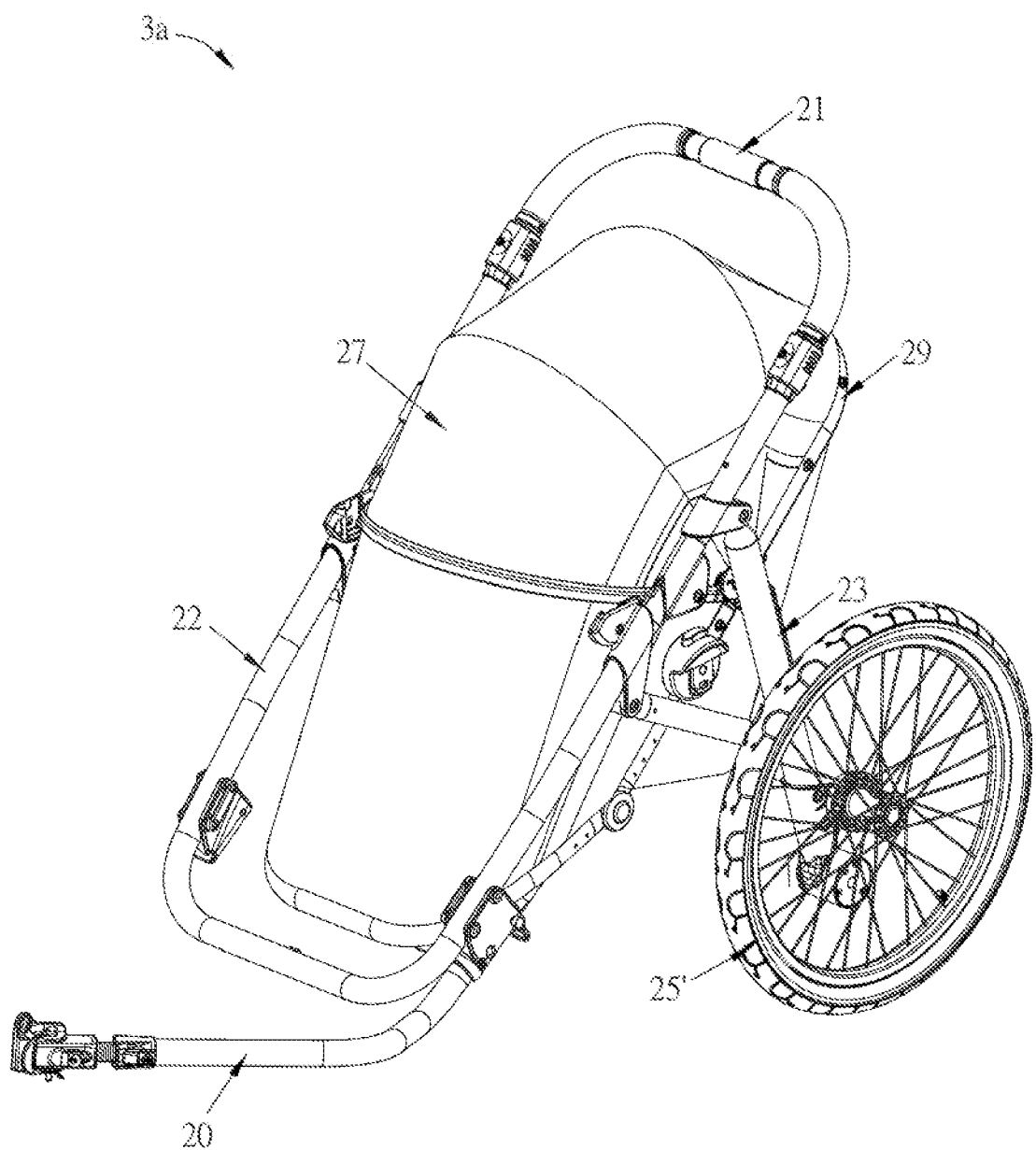
Figure 11A:
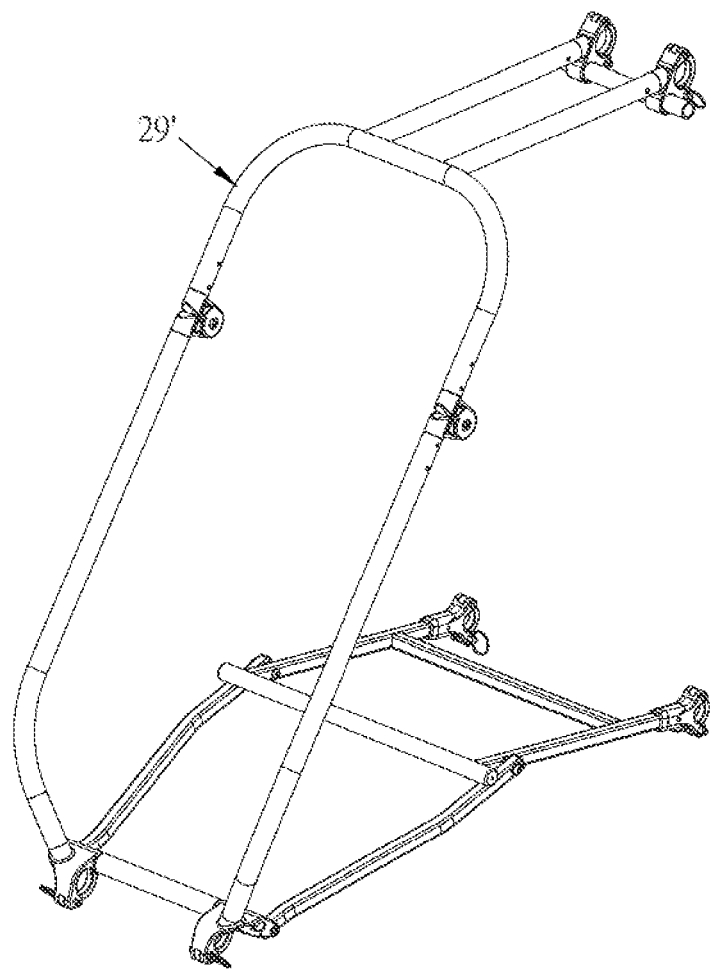
FIGS. 11A to 11C are schematic diagrams showing a second embodiment of converting the movable carrier of this disclosure to a baby trailer.
Figure 11B:
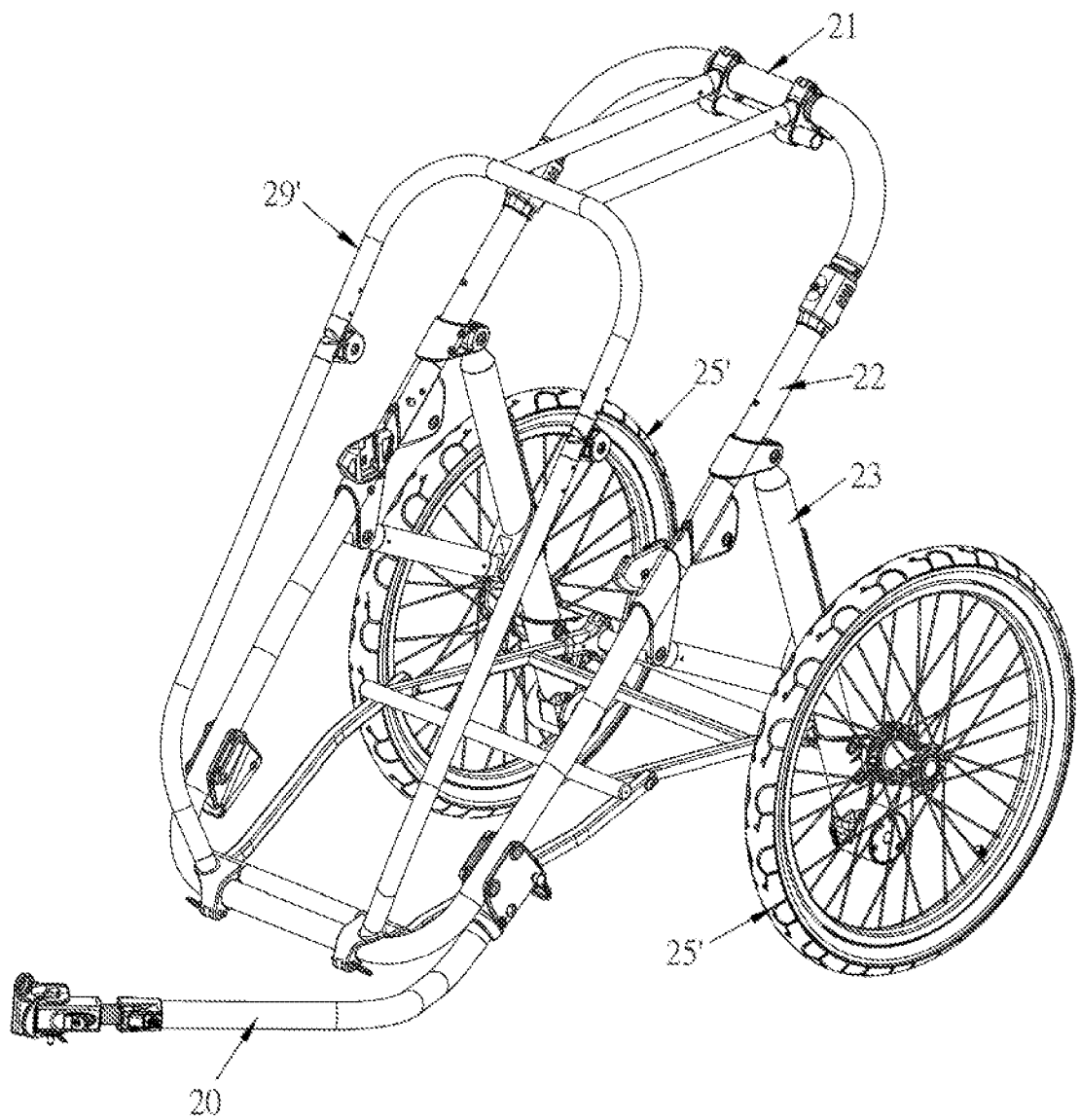
Figure 11C:
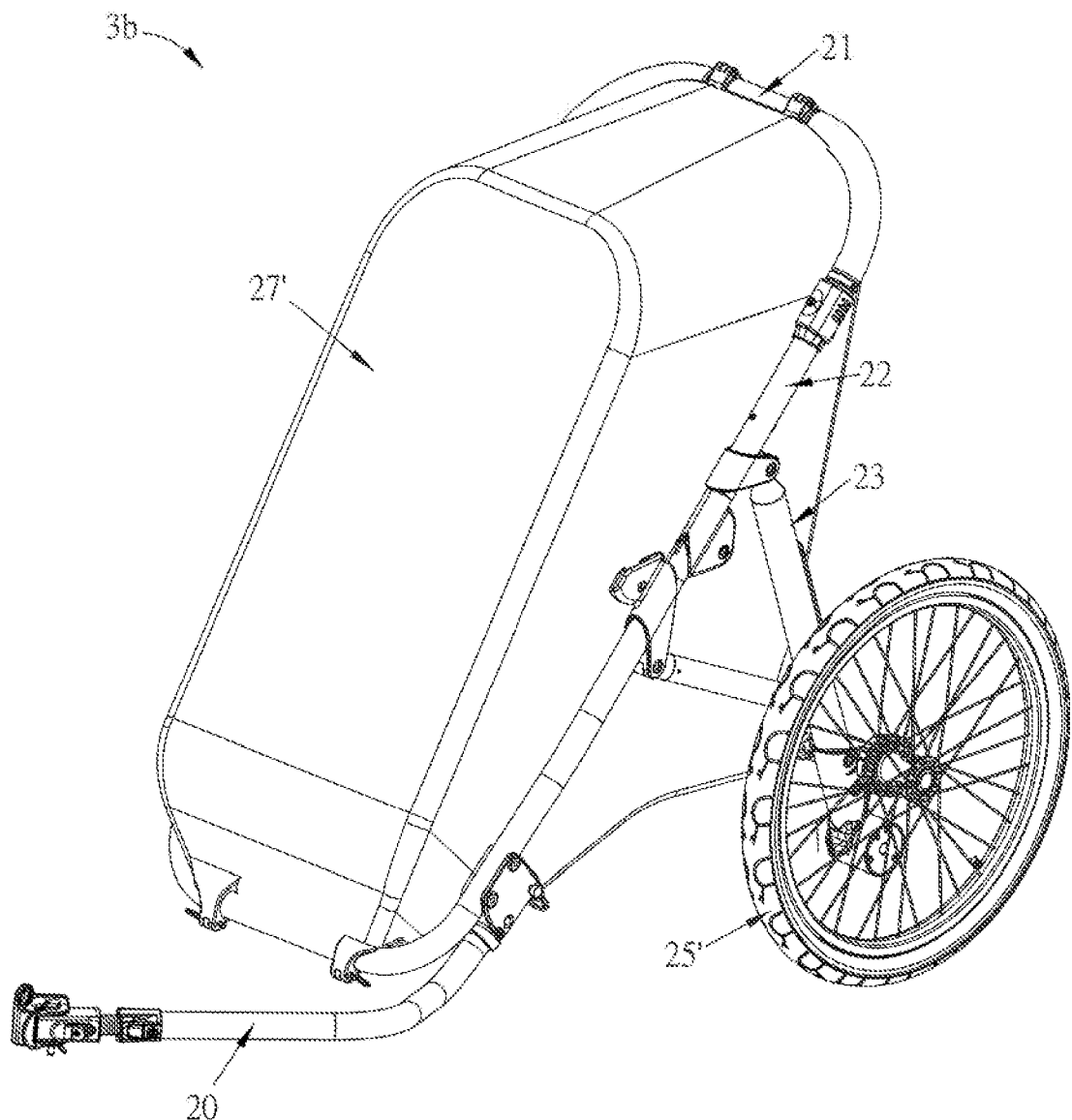

FIGS. 10A to 10E are schematic diagrams showing a first embodiment of converting the movable carrier of this disclosure to a baby trailer, and FIGS. 11A to 11C are schematic diagrams showing a second embodiment of converting the movable carrier of this disclosure to a baby trailer. FIGS. 10A to 10C show the components of the baby trailer 3a of the first embodiment, and FIGS. 10D to 10E show the assembled baby trailer 3a of the first embodiment. FIG. 11A shows the components of the baby trailer 3b of the second embodiment, and FIGS. 11B to 11C show the assembled baby trailer 3b of the second embodiment.

As shown in FIGS. 10A to 10E, this embodiment remains the seat frame 29 (FIG. 10A), the bracket (the support frame 22 and the bottom frame 23, FIG. 10B), the handlebar frame 21 (FIG. 10B) and the top canopy 27 (FIG. 10E) of the movable carrier 2. Firstly, the front wheel assemblies 24 and the rear wheel assemblies 25 of the movable carrier 2 are removed from the movable carrier 2. Then, the larger-sized rear wheel assemblies 25' (FIGS. 10C and 10D) are installed, and a tow bar 20 (FIG. 10C) is attached to one side of the support frame 22 (FIGS. 10D and 10E). Finally, the carry member 26 and the top canopy 27 are installed to form the baby trailer 3a of the first embodiment (FIG. 10E). In this case, the connection position of the seat frame 29 and the bracket (the support frame 22 and the bottom frame 23) is adjustable. In the baby trailer 3a, the connection position of the seat frame 29 and the bracket (the support frame 22 and the bottom frame 23) is different from the baby stroller mode. Herein, the seat frame 29 of the baby trailer 3a is connected to a lower position of the support frame 22 and the bottom frame 23, thereby lowering the gravity center of the baby trailer 3a. The configuration of the large-sized rear wheel assemblies 25' and the lower gravity center design allows the baby trailer 3a to travel safer and is less likely to be overturned. Furthermore, as shown in FIG. 10E, the top canopy 27 can be pulled down to cover the entire carry member 26 so as to block rain, wind, or dust. Moreover, in some embodiments, the top canopy 27 can be provided with a transparent film, a gauze, a zipper, an opening, or any of other suitable accessories to allow the babysitter to view the conditions of the infant or baby in the seat.

In addition, as shown in FIGS. 10B and 10C in view of FIGS. 11A to 11C, the second embodiment is to remove the seat frame 29, the front wheel assemblies 24 and the rear wheel assemblies 25 of the movable carrier 2 are removed from the movable carrier 2. Then, another seat frame 29' (FIG. 11A) is installed on the original bracket (the support frame 22 and the bottom frame 23) of the movable carrier 2. Afterward, the larger-sized rear wheel assemblies 25' are installed, and a tow bar 20 (FIG. 11B) is attached to one side of the support frame 22 (FIG. 11B). Finally, the corresponding carry member is installed on the seat frame 29' (corresponding to a new front cover 27', FIG. 11C) to form the baby trailer 3b of the second embodiment. In addition, as shown in FIG. 11C, the front cover 27' can be pulled down to cover the entire seat frame 29' and the carry member so as to block rain, wind, or dust. Moreover, the front cover 27' can be provided with a transparent film, a gauze, a zipper, an opening, or any of other suitable accessories to allow the babysitter to view the conditions of the infant or baby in the seat.

In addition, referring to the movable carrier 1 as shown in FIG. 2A, taking the link member 131 of the link assembly 13 as the boundary, the adapter member 133 at the same side as the front wheel assembly 112 is called a "front" adapter member, and the other adapter member 133 at the same side as the rear wheel assembly 113 is called a "rear" adapter member. As shown in FIGS. 6A to 6C, the movable carrier 1 is folded in the status that the front adapter member is at a high position and the rear adapter member is at a low position. However, if the front adapter member and the rear adapter member are at the same level, or the front adapter member is at a position lower than the rear adapter member, since the relative positions of the link assembly 13 and the bottom frame assembly 11 are fixed, the lower side of the front adapter member will abut the bottom frame assembly 11 and the second supporting member 14 cannot be further folded during the folding process. Therefore, the movable carrier 1 cannot be folded smoothly and easily unless the position of the link assembly 13 is adjusted to put the front adapter member at the position higher than the rear adapter member.

Accordingly, in the above-mentioned movable carrier 1, if the front adapter member and the rear adapter member are at the same level, or the front adapter member is at a position lower than the rear adapter member, the user has to manually adjust the link assembly 13 to move the front adapter member to the higher position and move the rear adapter member to the lower position (as shown in FIG. 6A), and then the movable carrier 1 can be easily folded.

In order to overcome the above problem, this disclosure further provides a movable carrier 1c, which can be easily folded in any arrangement of the front and rear adapter members (including the cases that the front adapter member is at a position higher than, equal to, or lower than the rear adapter member).

Figure 12A:
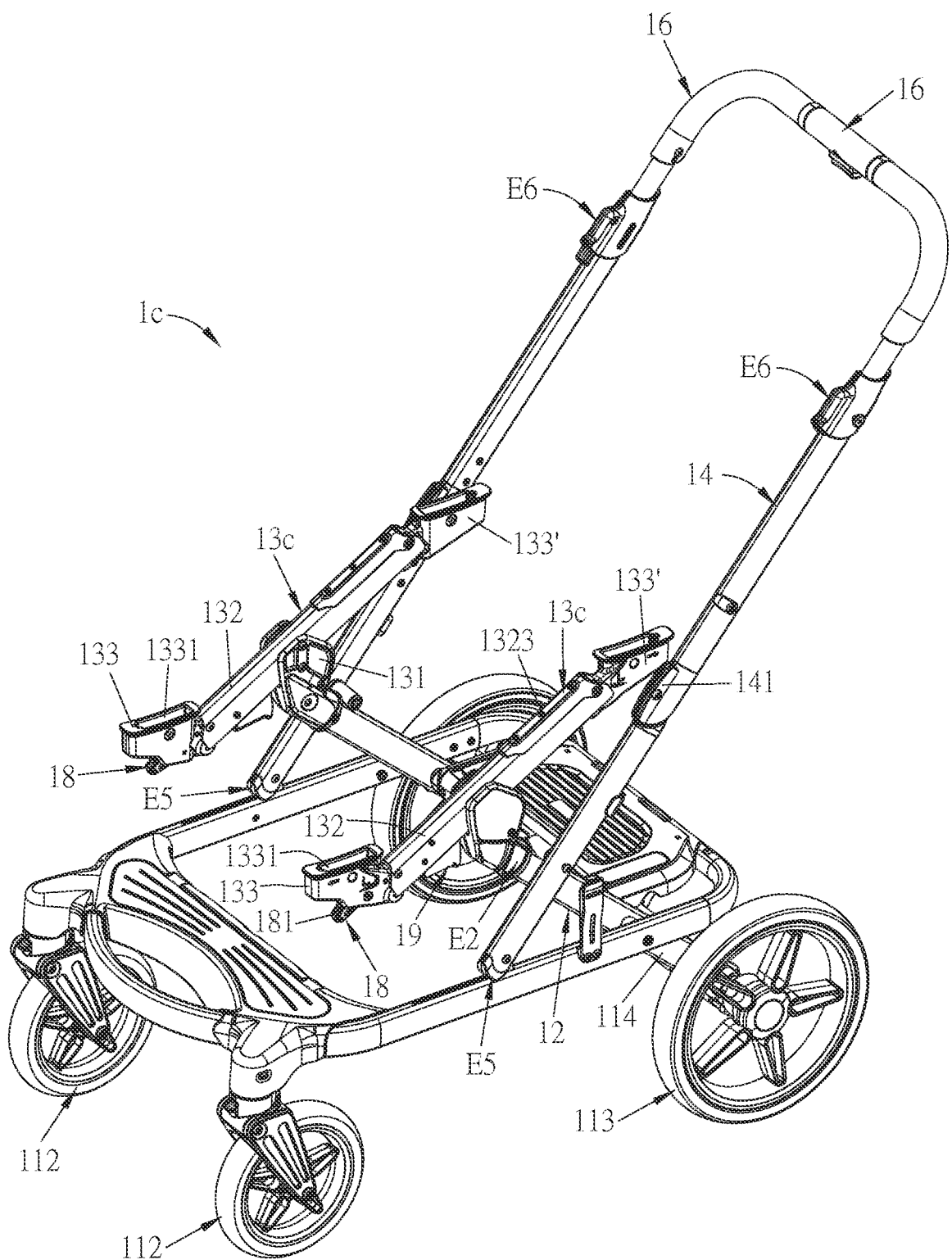
FIG. 12A is a schematic diagram showing a movable carrier according to another embodiment of this disclosure.
Figure 12B:
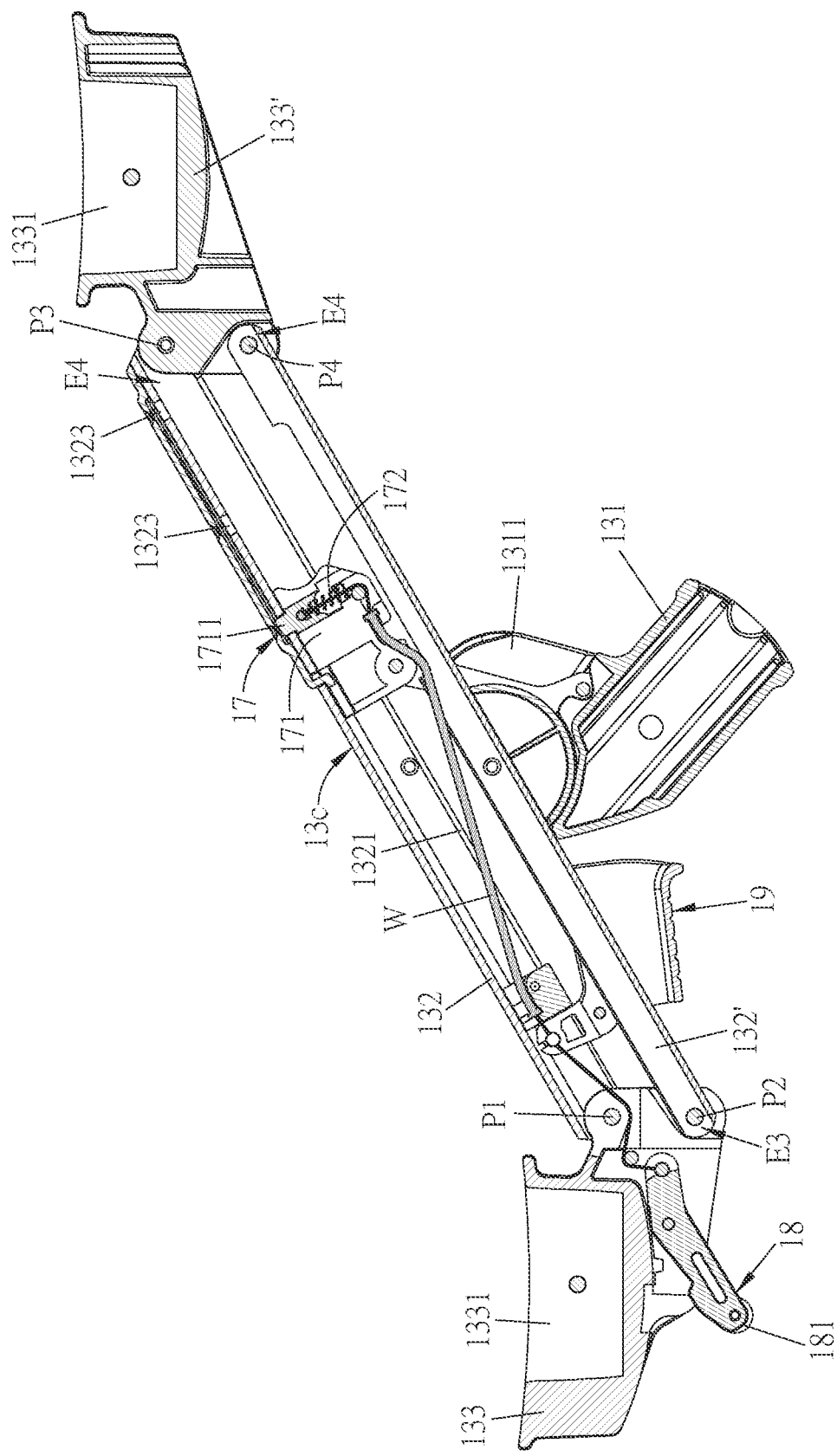
FIG. 12B is a sectional view of a part of the movable carrier of FIG. 12A.

FIG. 12A is a schematic diagram showing a movable carrier according to another embodiment of this disclosure, and FIG. 12B is a sectional view of a part of the movable carrier of FIG. 12A. To be noted, FIG. 12A shows the movable carrier 1c excluding the carry members, and FIGS. 12A and 12B show the case that the front adapter member 133 is at a position lower than the rear adapter member 133' for example.

Referring to FIGS. 12A and 12B, the movable carrier 1c of this embodiment is substantially the same as the movable carrier 1 of the previous embodiment. Different from the movable carrier 1, the internal structure of the link assembly 13c of the movable carrier 1c is different from that of the link assembly 13 of the movable carrier 1. In this embodiment, the link assembly 13c also comprises a link member 131, a first connect member 132, a second connect member 132', and two adapter members 133 and 133'. At least one position portion 1323 is configured at the upper side of the first connect member 132. For example, FIG. 12B shows that three position portions 1323 are configured at the upper side of the first connect member 132. The position portions 1323 can be arranged with equal interval or non-equal interval, and this disclosure is not limited. To be noted, the other technical contents of the link assembly 13c can be referred to the link assembly 13, so the detailed description thereof will be omitted.

In addition, the movable carrier 1c of this embodiment further comprises a position mechanism 17, a first unlock member 18, and a second unlock member 19.

The position mechanism 17 is disposed on the link assembly 13c and corresponds to the first connect member 132. In this embodiment, the position mechanism 17 is disposed corresponding to the position portions 1323. As shown in FIG. 12B, the position mechanism 17 comprises a position member 171 and an elastic member 172. The position member 171 can slide on the sliding track 1321 of the first connect member 132. A protrusion portion 1711 of the position member 171 is connected to the elastic member 172, and the protrusion portion 1711 protrudes from one of the position portions 1323 by the elastic member 172. Accordingly, the relative positions of the link assembly 13c and the bottom frame assembly 11 can be fixed. In other words, when the protrusion portion 1711 is protruded and engaged with one of the position portions 1323, the relative positions of the first connect member 132, the second connect member 132', the adapters 133 and 133', and the link member 131 will be fixed and cannot be changed.

The first unlock member 18 is disposed on the link assembly 13c. In the embodiment, the first unlock member 18 is disposed on one side of the link assembly 13c facing toward the bottom frame assembly 11, and the first unlock member 18 is connected to the position mechanism 17. The first unlock member 18 is located underneath the front adapter member 133, and is connected to the position mechanism 17 by a connect member W. Herein, the first unlock member 18 and the protrusion portion 1711 of the position member 171 can relatively move. Specifically, the first unlock member 18 can unlock the position mechanism 17 by the connect member W, so that the protrusion portion 1711 will be detached from one of the position portions 1323. In this circumstance, the relative positions of the first connect member 132, the second connect member 132', the adapters 133 and 133', and the link member 131 can be changed. For example, the connect member W can be a cable or a link rod. In this embodiment, the connect member W is a cable. In addition, the first unlock member 18 of this embodiment comprises a leading wheel 181. When the first unlock member 18 contacts the bottom frame assembly 11, the leading wheel 181 can slide (move) on the bottom frame assembly 11.

When the first unlock member 18 contacts the bottom frame assembly 11, the first unlock member 18 can carry the position mechanism 17 to move for changing the position of the first connect member 132 relative to the link member 131, thereby changing the relative positions of the link assembly 13c and the bottom frame assembly 11. In this embodiment, when the first unlock member 18 contacts the bottom frame assembly 11, and is pressed toward and inserted into the front adapter member 133 by the bottom frame assembly 11, the first unlock member 18 can carry the position mechanism 17 to detach from one of the position portions 1323 of the first connect member 132. In this status, the positions of the first connect member 132, the second connect member 132', and the adapter members 133 and 133' relative to the link member 131, thereby changing the relative positions of the link assembly 13c and the bottom frame assembly 11. In this embodiment, the first unlock member 18 carries the protrusion portion 1711 of the position member 171 to automatically detach from one of the position portions 1323 of the first connect member 132 by the connect member W, so that the relative positions of the link assembly 13c and the bottom frame assembly 11 can be automatically changed. Therefore, the first unlock member 18 can also be defined as an automatic unlock device.

The second unlock member 19 is disposed on the link assembly 13c. In this embodiment, the second unlock member 19 is disposed at one side of the link assembly 11 facing toward the bottom frame assembly 11. The second unlock member 19 can carry the position mechanism 17 to detach from one of the position portions 1323 of the first connect member 132, thereby changing the positions of the first connect member 132, the second connect member 132', and the adapter members 133 and 133' relative to the link member 131. Herein, the second unlock member 19 is also connected to the position member 171 of the position mechanism 17 by the connect member W (e.g. a cable). Accordingly, when the user presses the second unlock member 19, the second unlock member 19 can carry the protrusion portion 1711 of the position member 171 by the connect member W to detach from one of the position portions 1323 of the first connect member 132, thereby manually changing the positions of the first connect member 132, the second connect member 132', and the adapter members 133 and 133' relative to the link member 131. In other words, the relative positions of the link assembly 13c and the bottom frame assembly 11 can be manually changed. Therefore, the second unlock member 19 can be defined as a manual unlock device.

In the above-mentioned automatic unlock process and manual unlock process, when the positions of the first connect member 132 and the second connect member 132' are changed with relative to the link member 131, the adapter portions 1331 are all oriented to the same direction; when the positions of the first connect member 132 and the second connect member 132' are changed with relative to the link member 131, the first connect member 132 and the second connect member 132' remain in parallel to each other; when the positions of the first connect member 132 and the second connect member 132' are changed with relative to the link member 131, the distance between the bottom frame assembly 11 and each of the adapter portions 1331 is changed.

Figure 13A:
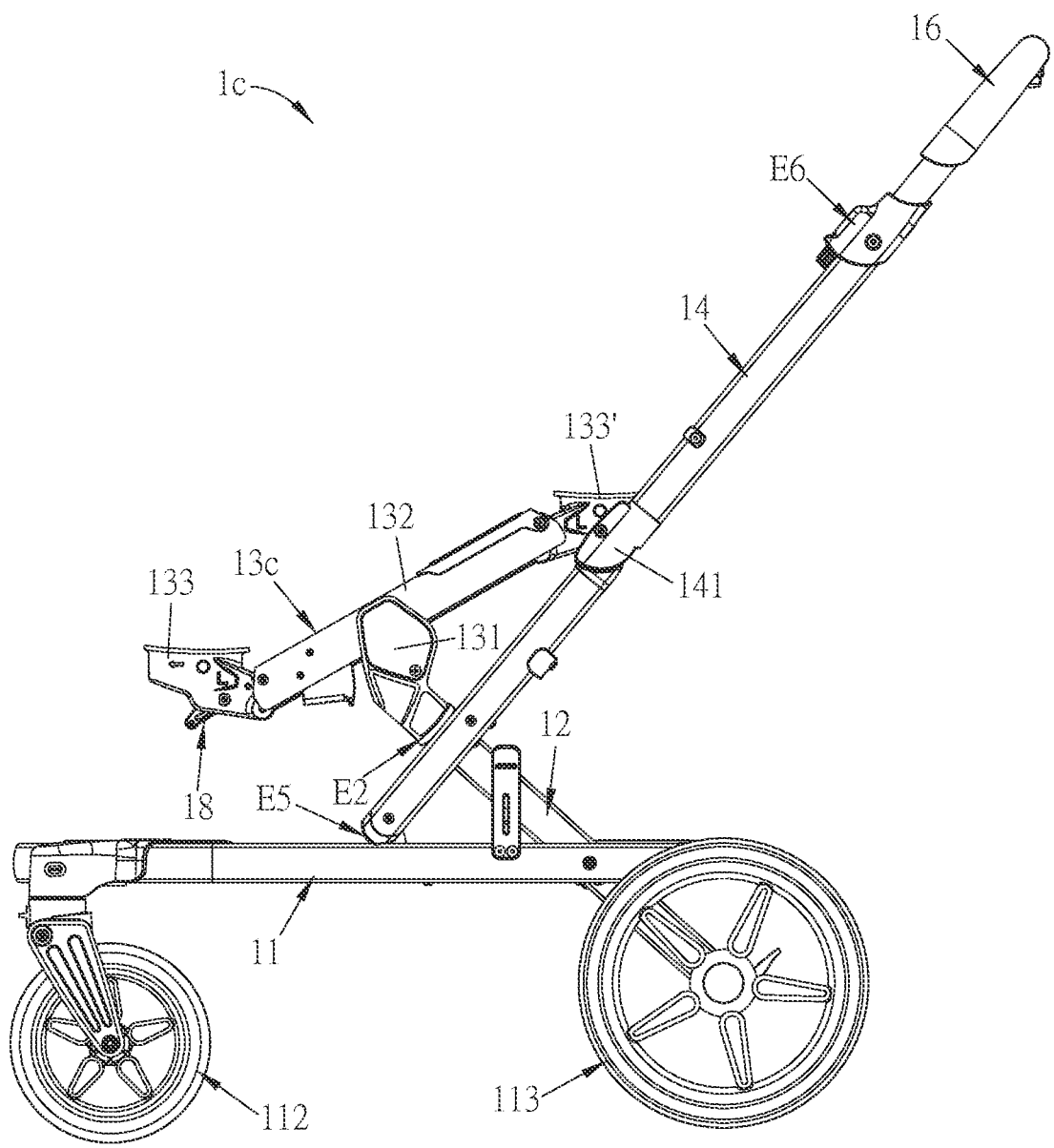
FIGS. 13A, 13B, 13C and 13E are schematic diagrams showing a folding process of the movable carrier of FIG. 12A.
Figure 13B:
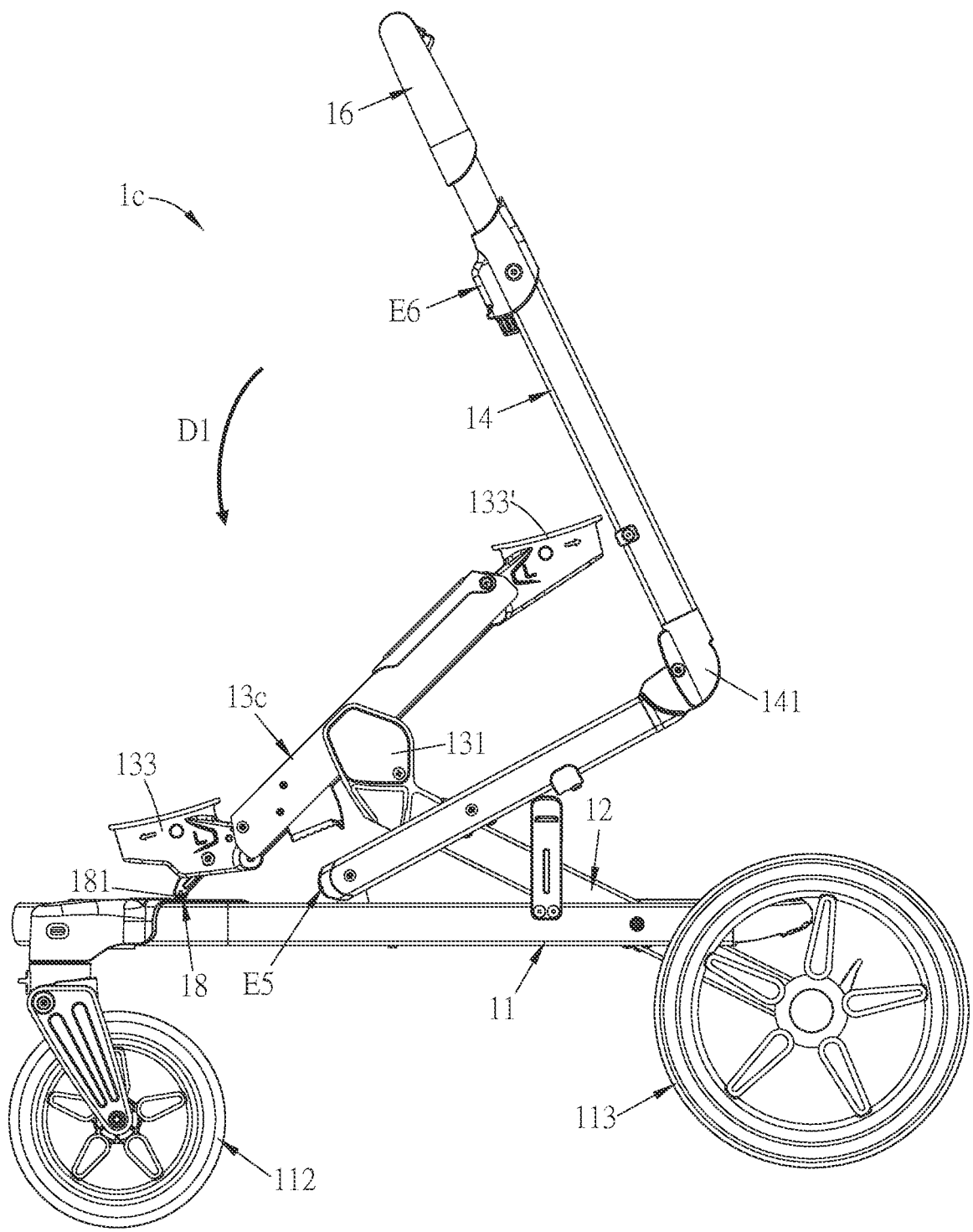
Figure 13C:
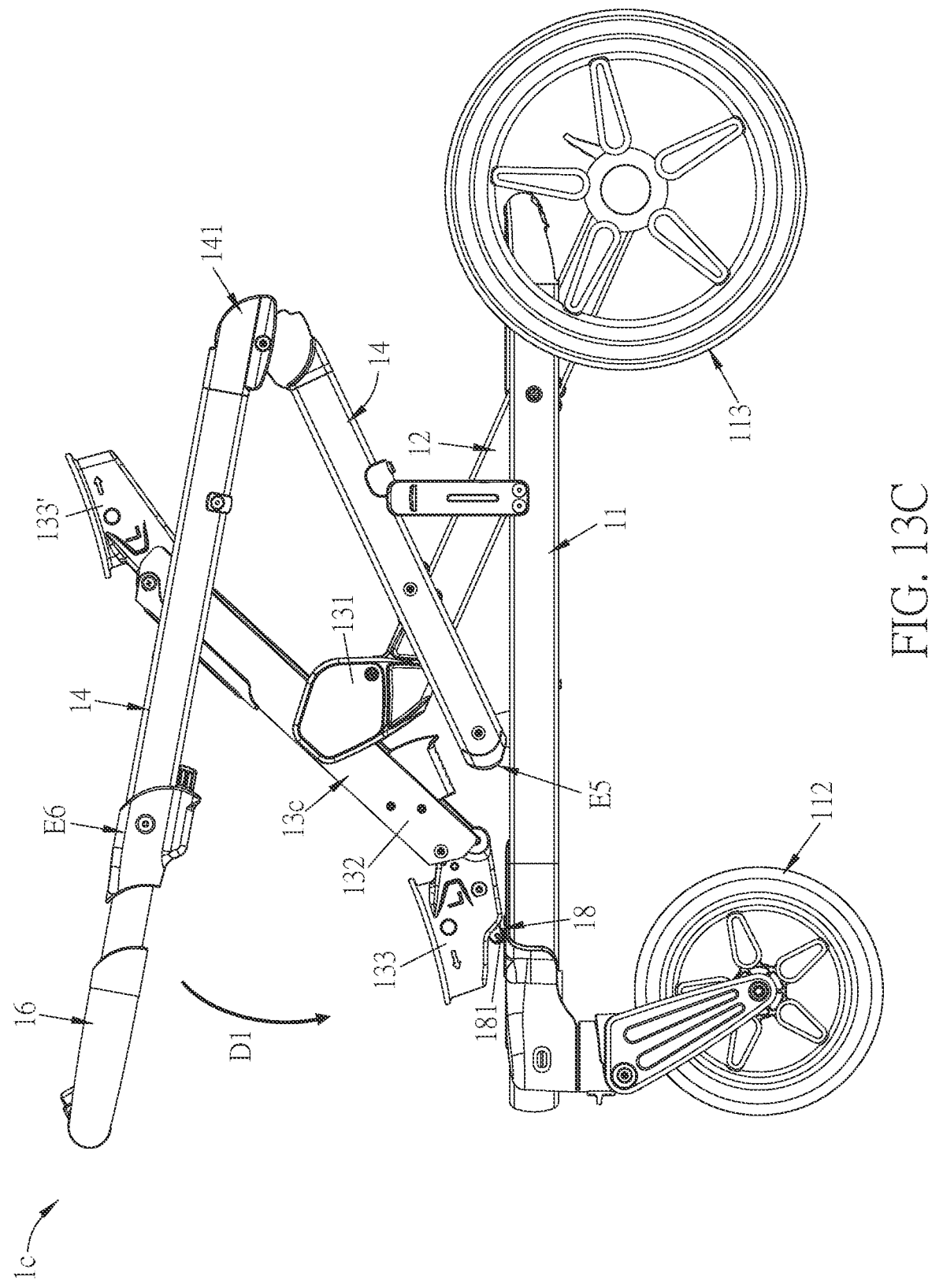
Figure 13D:
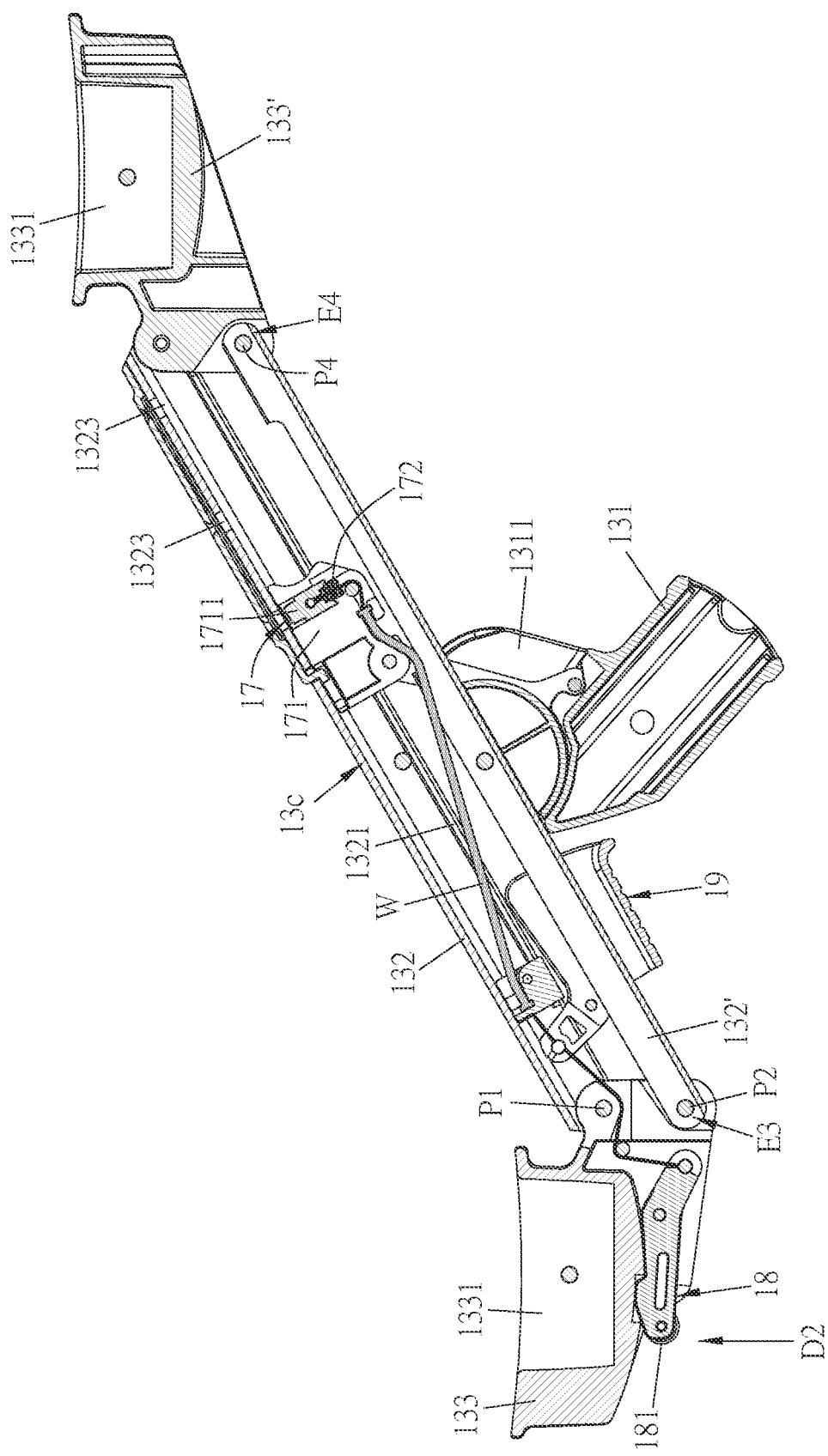
FIG. 13D is a sectional view of a part of the movable carrier of FIG. 13A.

FIGS. 13A, 13B, 13C and 13E are schematic diagrams showing a folding process of the movable carrier of FIG. 12A, and FIG. 13D is a sectional view of a part of the movable carrier of FIG. 13A. In this embodiment, FIGS. 13A, 13B, 13C and 13E are schematic diagrams showing the movable carrier 1c excluding the carry members, and FIG. 13D is a schematic diagram showing the structure of the link assembly 13c, the position mechanism 17, the first unlock member 18, and the second unlock member 19 as shown in FIG. 13C. For example, in this embodiment as shown in FIG. 13C, the front adapter member 133 is at a position lower than the rear adapter member 133'.

The folding method of the movable carrier 1c of this embodiment comprises the following steps 1 to 4.

As shown in FIG. 13A, the step 1 is to separate the two carry members from the link assembly 13c.

The step 2 is to fold a part of the second support member 14 about a folding pivot portion 141 of the second support member 14 toward the bottom frame assembly 11, thereby carrying the first support member 12 and the link assembly 13c to move toward the bottom frame assembly 11. As shown in FIG. 13B, the upper half of the second support member 14 is folded about the folding pivot portion 141 of the second support member 14 toward the bottom frame assembly 11 (the direction D1), thereby carrying the first support member 12 and the link assembly 13c to move toward the bottom frame assembly 11.

As shown in FIGS. 13B to 13D, the step 3 is to continuously push the second support member 14 toward the bottom frame assembly 11 to make the first unlock member 18 contact the bottom frame assembly 11 so as to carry the position mechanism 17 to move, thereby changing the position of the first connect member 132 relative to the link member 131. Herein, the second support member 14 is continuously folded toward and approaching the bottom frame assembly 11, the first unlock member 18 contacts bottom frame assembly 11 and is pressed by the bottom frame assembly 11, and the position mechanism 17 is carried to detach from one of the position portions 1323 of the first connect member 132 (FIG. 13D). Accordingly, the position of the first connect member 132 relative to the link member 131 can be changed. In this embodiment, when the first unlock member 18 contacts the bottom frame assembly 11 and is pressed by the bottom frame assembly 11 (in the direction D2), the leading wheel 181 of the first unlock member 18 can slide on the bottom frame assembly 11 (FIG. 13C). In addition, when the first unlock member 18 contacts the bottom frame assembly 11 and is pressed by the bottom frame assembly 11 (in the direction D2), the first unlock member 18 can carry the protrusion portion 1711 of the position member 171 by the connect member W to automatically detach from one of the position portions 1323 of the first connect member 132 (detaching from the leftmost position portion 1323 as shown in FIG. 12B). Meanwhile, the second unlock member 19 is also pressed into the link assembly 13c. Accordingly, in the process of continuously pushing the second support member 14 toward the bottom frame assembly 11, the positions of the first connect member 132 and the second connect member 132' can be changed with relative to the link member 131. That is, the position of the link member 131 relative to the bottom frame assembly 11 can be changed. In this circumstance, the link member 131 can be rotated in a direction opposite to the first direction D1, and then automatically folded and approaching the bottom frame assembly 11.

Finally, the step 4 is to continuously push the second support member 14 toward the bottom frame assembly 11 until the second support member 14 is parallel to the bottom frame assembly 11. When the second support member 14 moves toward and approaches the bottom frame assembly 11, the first support member 12 and the link assembly 13c will be carried to move downwardly, so that the first support member 12 and the link assembly 13c will approach the bottom frame assembly 11 until the second support member 14 is parallel to the bottom frame assembly 11. Meanwhile, the first connect member 132 can be substantially parallel to the bottom frame assembly 11, thereby finishing the folding process of the movable carrier 1c.

Figure 14A:
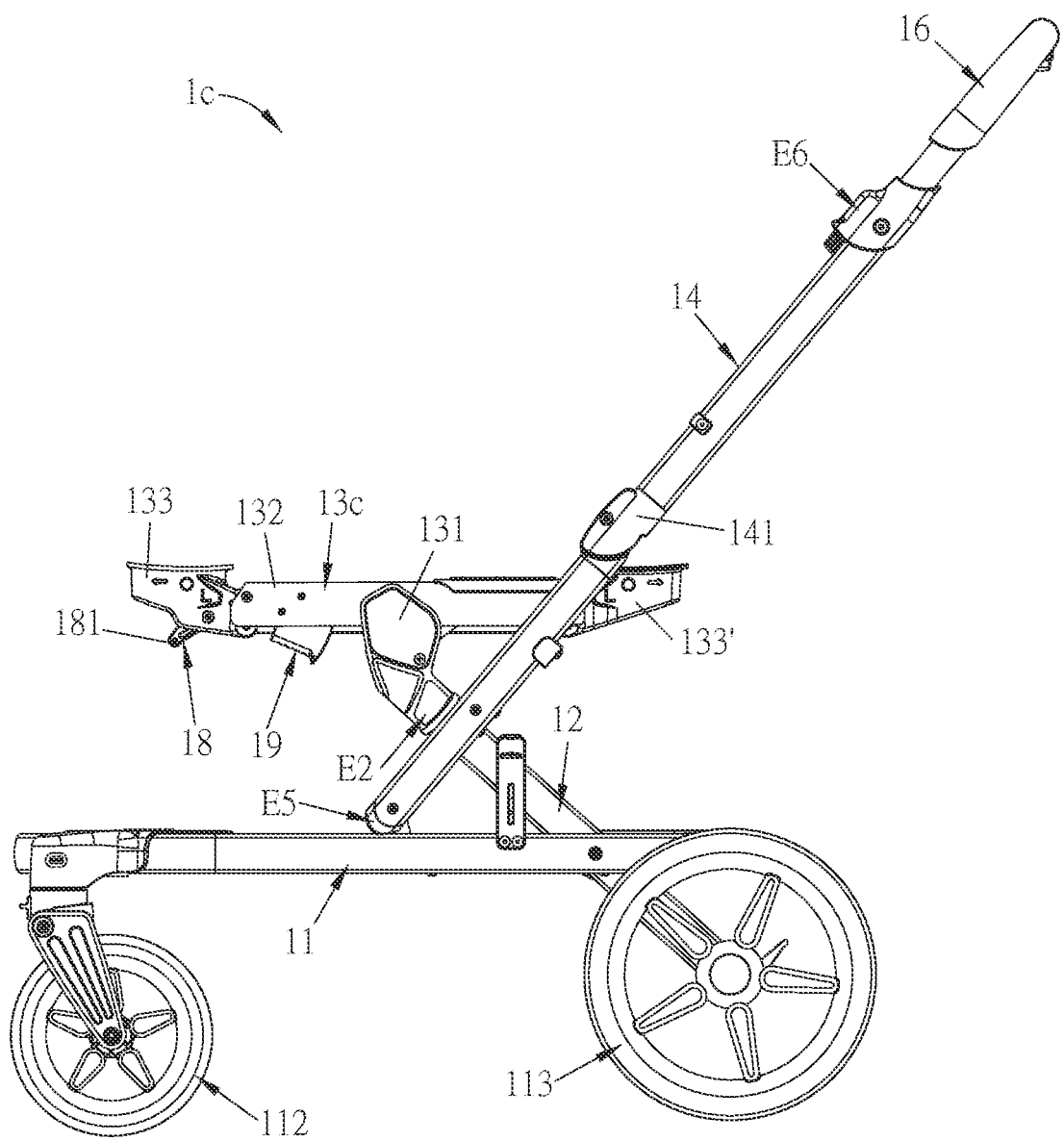
FIGS. 14A and 14B are schematic diagram showing another folding process of the movable carrier of FIG. 12A.
Figure 14B:
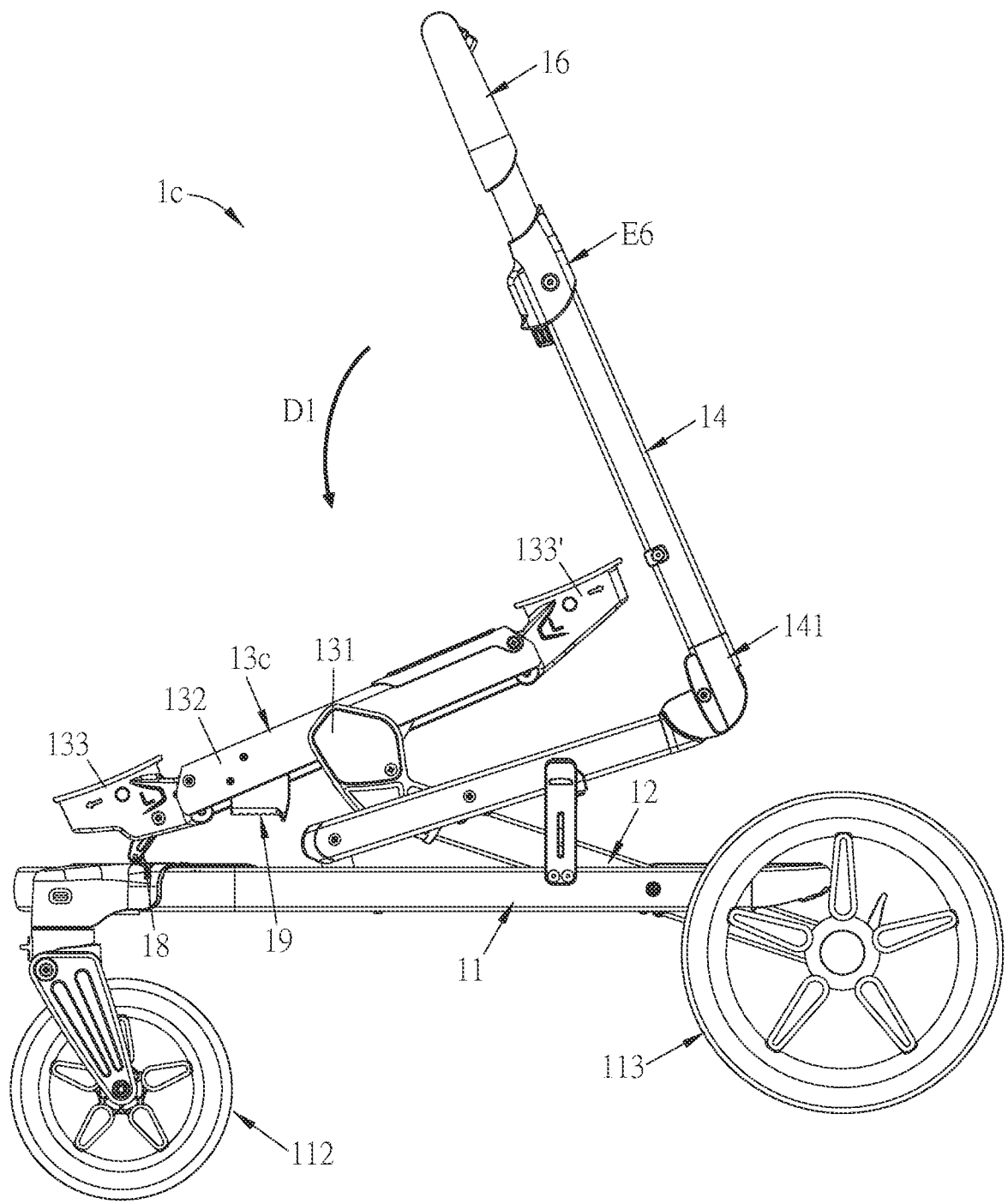
Figure 15A:
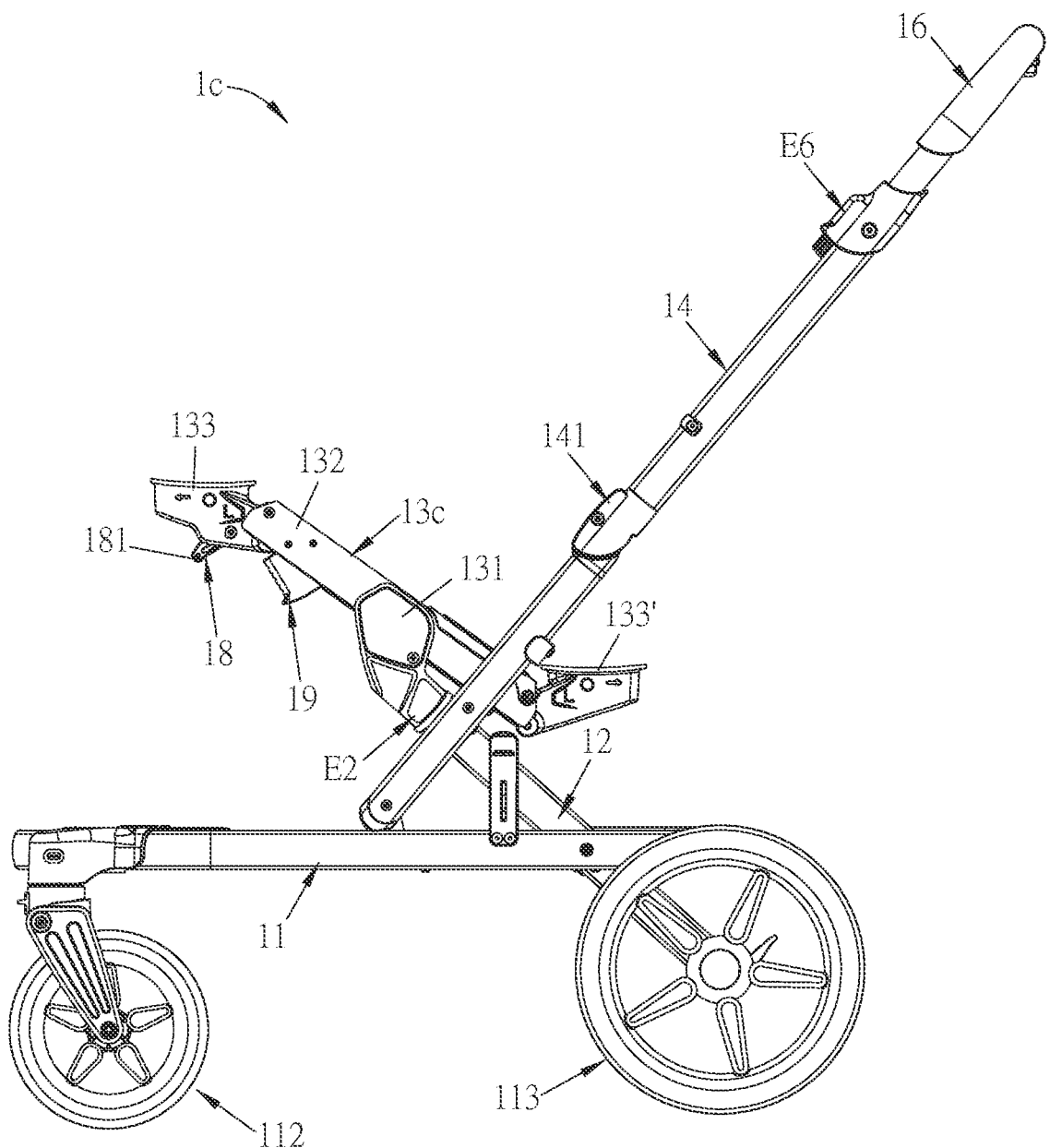
FIGS. 15A and 15B are schematic diagram showing another folding process of the movable carrier of FIG. 12A.
Figure 15B:
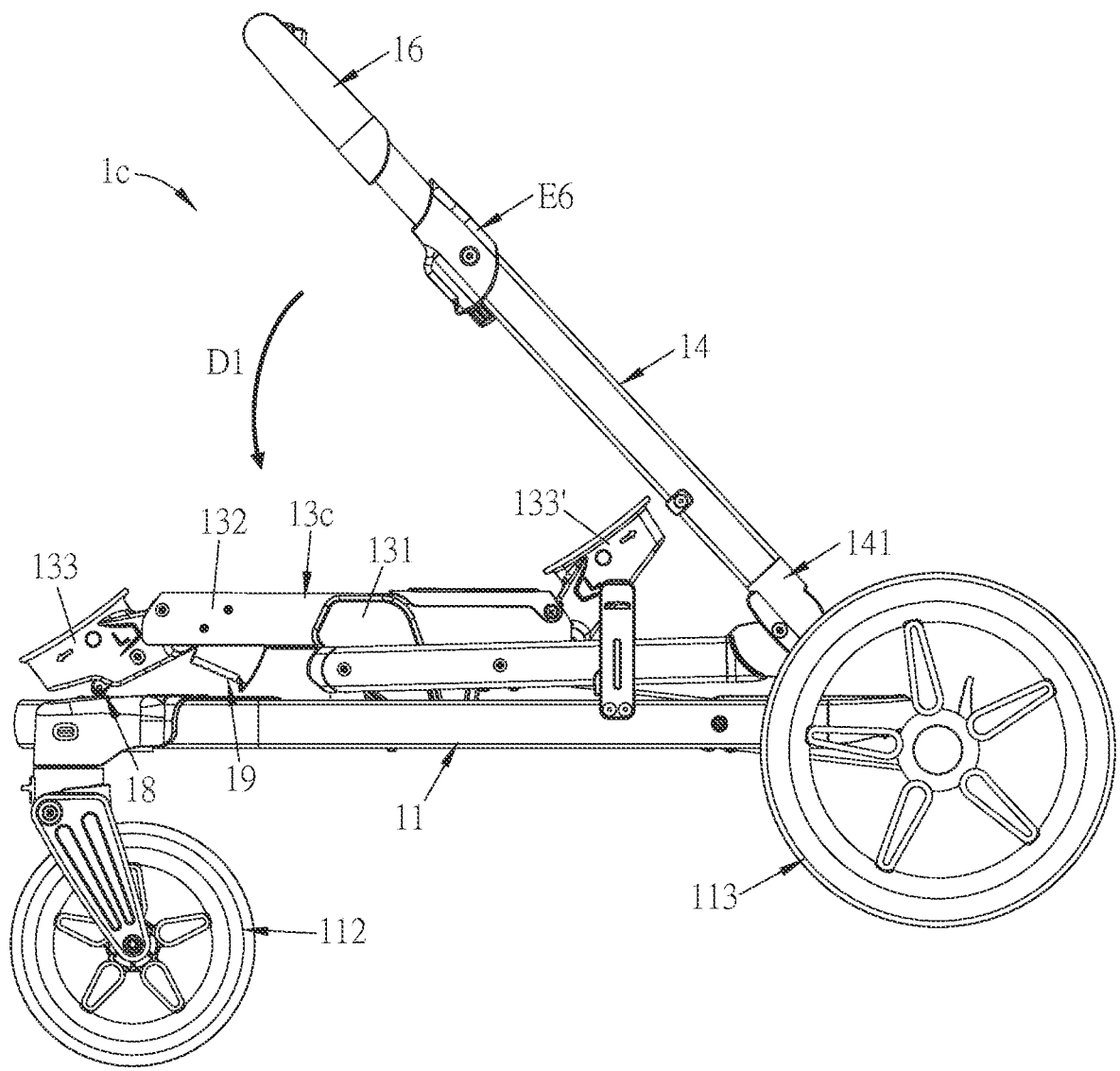

FIGS. 14A and 14B are schematic diagram showing another folding process of the movable carrier of FIG. 12A, and FIGS. 15A and 15B are schematic diagram showing yet another folding process of the movable carrier of FIG. 12A. In the embodiment as shown in FIGS. 14A and 14B, the front adapter member 133 and the rear adapter member 133' are located at the same level. In the embodiment as shown in FIGS. 15A and 15B, the front adapter member 133 is located at a position higher than the rear adapter member 133'.

Figure 13E:
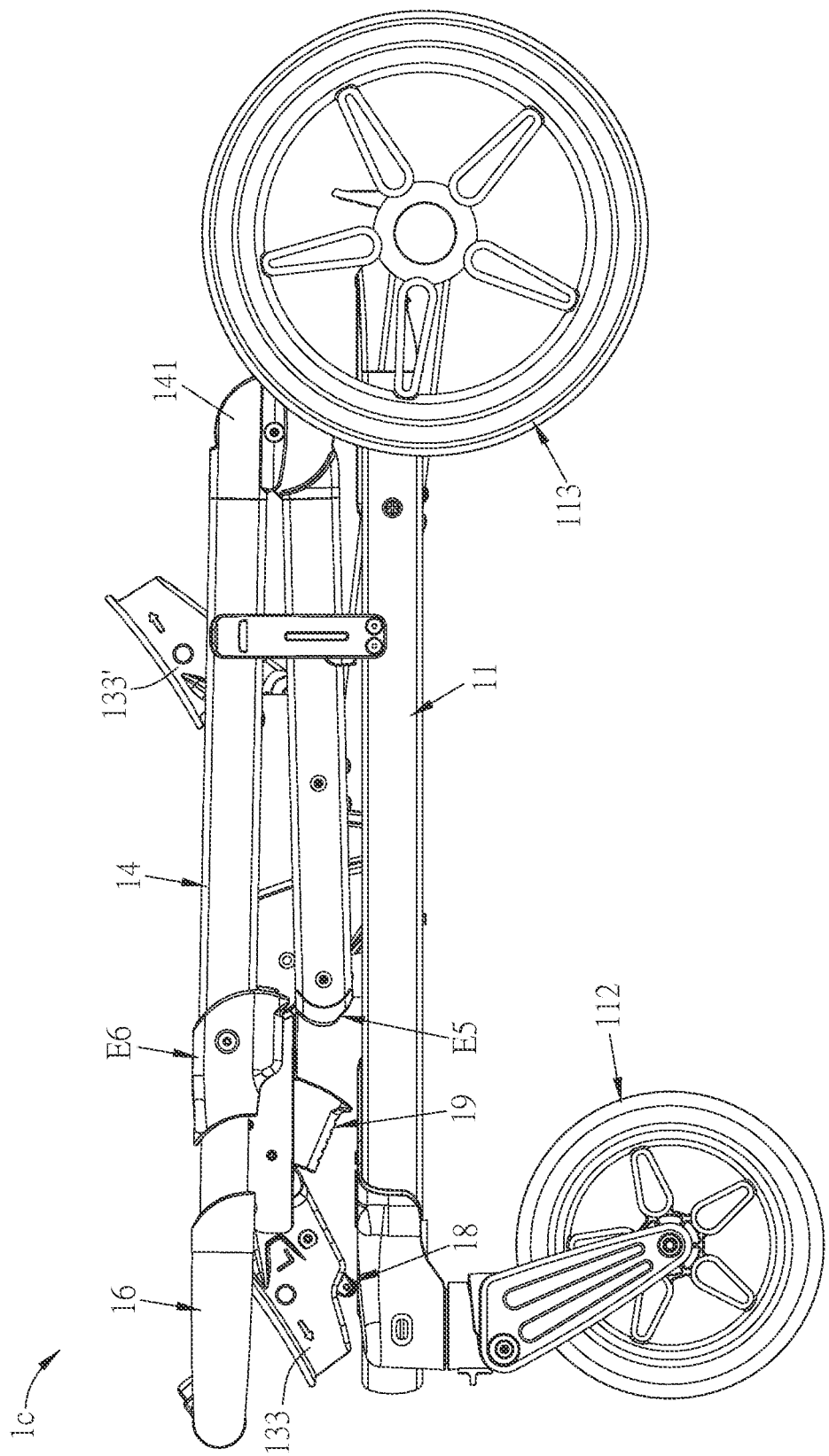

As shown in FIGS. 14A and 14B, when the front adapter member 133 and the rear adapter member 133' are located at the same level, the step of manually adjusting the relative positions of the front adapter member 133 and the rear adapter member 133' by the second unlock member 19 is not needed, and the movable carrier 1c as shown in FIG. 14A can be folded to the folded status as shown in FIG. 13E after performing the above-mentioned steps 1 to 4. The folding steps can refer to the above embodiment, so the detailed description thereof will be omitted.

As shown in FIGS. 15A and 15B, when the front adapter member 133 is located at a position higher than the rear adapter member 133', the step of manually adjusting the relative positions of the front adapter member 133 and the rear adapter member 133' by the second unlock member 19 is also not needed, and the movable carrier 1c as shown in FIG. 15A can be folded to the folded status as shown in FIG. 13E after performing the above-mentioned steps 1 to 4. The folding steps can refer to the above embodiment, so the detailed description thereof will be omitted.

In summary, in the movable carrier of this disclosure, the position mechanism is disposed on the link assembly and corresponds to the first connect member, and the first unlock member is disposed on the link assembly and connected to the position mechanism. When the first unlock member contacts the bottom frame assembly, the first unlock member carries the position mechanism to move to change the position of the first connect member relative to the link member. Accordingly, the movable carrier of this disclosure can be easily folded without adjusting the positions of the two adapter members of the link assembly relative to the bottom frame assembly in advance. Therefore, most users (even a weak user or a lady holding a babe or goods) can easily finish the folding operation of the movable carrier of this disclosure, which can facilitate the storage and carrying of the movable carrier.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A movable carrier, comprising:
   a bottom frame assembly;
   a first support member having a first end portion and a second end portion, wherein the first end portion is pivotally connected to the bottom frame assembly;
   a link assembly disposed corresponding to the first support member, wherein the link assembly comprises a link member and a first connect member, the link member is disposed at the second end portion of the first support member, and the first connect member is pivotally connected to the link member and connected to the second end portion of the first support member through the link member;
   a position mechanism disposed on the link assembly and corresponding to the first connect member; and
   a first unlock member disposed on the link assembly and connected to the position mechanism;
   wherein, when the first unlock member contacts the bottom frame assembly, the first unlock member carries the position mechanism to move to change a position of the first connect member relative to the link member.

2. The movable carrier of claim 1, wherein the first unlock member comprises a leading wheel, and the leading wheel is slidable on the bottom frame assembly.

3. The movable carrier of claim 1, wherein the first connect member comprises at least one position portion, the position mechanism corresponds to the at least one position portion of the first connect member;

wherein, when the first unlock member is pressed by the bottom frame assembly, the first unlock member carries the position mechanism to detach from the at least one position portion of the first connect member.

4. The movable carrier of claim 3, wherein the position mechanism comprises a position member and an elastic member, a protrusion portion of the position member is connected to the elastic member, and the protrusion portion protrudes from the at least one position portion by the elastic member.

5. The movable carrier of claim 4, wherein when the first unlock member is pressed by the bottom frame assembly, the first unlock member carries the protrusion portion of the position member by a connect member to automatically detach from the at least one position portion of the first connect member.

6. The movable carrier of claim 4, wherein the first connect member further comprises a sliding track, and the position member is slidable on the sliding track.

7. The movable carrier of claim 3, wherein the link assembly further comprises a second connect member and two adapter members, the second connect member is pivotally connected to the link member and connected to the second end portion of the first support member through the link member, the adapter members are disposed corresponding to ends of the first connect member and the second connect member, and each of the adapter members has an adapter portion;

wherein, in a process of changing positions of the first connect member and the second connect member relative to the link member, the adapter portions are all oriented to the same direction.

8. The movable carrier of claim 7, wherein in the process of changing the positions of the first connect member and the second connect member relative to the link member, the first connect member and the second connect member maintain in parallel.

9. The movable carrier of claim 7, wherein in the process of changing the positions of the first connect member and the second connect member relative to the link member, a distance between the bottom frame assembly and each of the adapter portions is changed.

10. The movable carrier of claim 7, wherein each of the first connect member and the second connect member comprises a third end portion and a fourth end portion, the third end portion of the first connect member is located corresponding to the third end portion of the second connect member, the fourth end portion of the first connect member is located corresponding to the fourth end portion of the second connect member, one of the two adapter portions connects to both of the third end portion of the first connect member and the third end portion of the second connect member, and the other one of the two adapter portions connects to both of the fourth end portion of the first connect member and the fourth end portion of the second connect member.

11. The movable carrier of claim 7, further comprising:
a second unlock member disposed on the link assembly, wherein the second unlock member carries the position mechanism to detach from the at least one position portion of the first connect member, thereby changing positions of the first connect member, the second connect member and the adapter members relative to the link member.

12. The movable carrier of claim 1, further comprising:
a second support member crossingly connected with the first support member, wherein the second support member comprises a fifth end portion, and the fifth end portion is pivotally connected to the bottom frame assembly.

13. A folding method for a movable carrier, wherein the movable carrier comprises a bottom frame assembly, a first support member, a link assembly, a position mechanism, a first unlock member, a second support member, and two carry members, the first support member has a first end portion pivotally connected to the bottom frame assembly, the link assembly comprises a link member and a first connect member, the link member is disposed at a second end portion of the first support member, the first connect member is pivotally connected to the link member and connected to the second end portion of the first support member through the link member, the position mechanism is disposed on the link assembly and corresponding to the first connect member, the first unlock member is disposed on the link assembly and connected to the position mechanism, the second support member and the first support member are crossingly connected, one end of the second support member is pivotally connected to the bottom frame assembly, and the two carry members are correspondingly disposed at two ends of the link assembly, the folding method comprising:
separating the two carry members from the link assembly;
folding a part of the second support member about a folding pivot portion of the second support member toward the bottom frame assembly, thereby carrying the first support member and the link assembly to move toward the bottom frame assembly;
continuously pushing the folded second support member toward the bottom frame assembly to make the first unlock member contact the bottom frame assembly so as to carry the position mechanism to move, thereby changing the position of the first connect member relative to the link member; and
continuously pushing the folded second support member toward the bottom frame assembly until the second support member is parallel to the bottom frame assembly.

14. The folding method of claim 13, wherein the first unlock member comprises a leading wheel, and when the first unlock member contacts the bottom frame assembly and is pressed by the bottom frame assembly, the leading wheel is slidable on the bottom frame assembly.

15. The folding method of claim 13, wherein the first connect member comprises at least one position portion, the position mechanism corresponds to the at least one position portion of the first connect member;

wherein, when the first unlock member is pressed by the bottom frame assembly, the first unlock member carries the position mechanism to detach from the at least one position portion of the first connect member.

16. The folding method of claim 15, wherein the position mechanism comprises a position member and an elastic member, a protrusion portion of the position member is connected to the elastic member, and the protrusion portion protrudes from the at least one position portion by the elastic member.

17. The folding method of claim 16, wherein when the first unlock member is pressed by the bottom frame assembly, the first unlock member carries the protrusion portion of the position member by a connect member to automatically detach from the at least one position portion of the first connect member.

18. The folding method of claim 15, wherein the link assembly further comprises a second connect member and two adapter members, the second connect member is pivotally connected to the link member and connected to the second end portion of the first support member through the link member, the adapter members are disposed corresponding to ends of the first connect member and the second connect member, and each of the adapter members has an adapter portion;
- wherein, in a process of changing positions of the first connect member and the second connect member relative to the link member, the adapter portions are all oriented to the same direction; and
- wherein, the first connect member and the second connect member maintain in parallel.

19. The folding method of claim 18, wherein in the process of changing the positions of the first connect member and the second connect member relative to the link member, a distance between the bottom frame assembly and each of the adapter portions is changed.

20. The folding method of claim 18, wherein the movable carrier further comprises a second unlock member disposed on the link assembly;
- wherein, when the position of the second unlock member is changed relative to the link assembly, the second unlock member carries the position mechanism to detach from the at least one position portion of the first connect member, thereby changing positions of the first connect member, the second connect member and the adapter members relative to the link member.

* * * * *